United States Patent [19]

Curley et al.

[11] 4,236,203
[45] Nov. 25, 1980

[54] SYSTEM PROVIDING MULTIPLE FETCH BUS CYCLE OPERATION

[75] Inventors: John L. Curley, Sudbury; Robert B. Johnson, Billerica; Richard A. Lemay, Bolton; Chester M. Nibby, Jr., Peabody, all of Mass.

[73] Assignee: Honeywell Information Systems Inc., Waltham, Mass.

[21] Appl. No.: 867,270

[22] Filed: Jan. 5, 1978

[51] Int. Cl.³ .................... G06F 1/04; G06F 13/00
[52] U.S. Cl. ................................................ 364/200
[58] Field of Search ... 364/200 MS File, 900 MS File

[56] References Cited
U.S. PATENT DOCUMENTS

| | | | |
|---|---|---|---|
| 3,710,324 | 1/1973 | Cohen | 364/200 |
| 3,997,896 | 12/1976 | Cassarino, Jr. | 364/200 |

*Primary Examiner*—James D. Thomas
*Attorney, Agent, or Firm*—William A. Linnell; Nicholas Prasinos; Ronald T. Reiling

[57] ABSTRACT

In a system which includes a common bus to which a plurality of units are connected for the transfer of information, such as a data processing system, information may be transferred by the highest priority requesting unit during an asynchronously generated bus transfer cycle. Logic is provided for enabling a multiple fetch operation in which the master unit requesting multiple words of information from the slave unit during a first bus transfer cycle may receive such information from the slave unit during a series of later slave generated bus cycles. Logic is provided for enabling any other units to communicate over the common bus during the time between the first cycle and such last cycle during which the slave unit responds, thereby enabling at least two pairs of units to communicate with each other respectively, in an interleaved manner.

19 Claims, 16 Drawing Figures

SYSTEM PROVIDING MULTIPLE FETCH BUS CYCLE OPERATION

CROSS-REFERENCES TO RELATED APPLICATIONS

The following patent applications, which are assigned to the same assignee as the instant application and have been filed on an even date with the instant application, have related subject matter. Certain portions of the system and processes herein disclosed are not our invention, but are the invention of the below named inventors as defined by the claims in the following patent applications:

| TITLE | INVENTORS | SER. NO. |
|---|---|---|
| 1. System Providing Adaptive Response in Information Requesting Unit | W. E. Woods R. A. Lemay J. L. Curley | 867,262 |
| 2. System Providing Multiple Outstanding Information Requests | R. A. Lemay J. L. Curley | 867,266 |

BACKGROUND OF THE INVENTION

The apparatus of the present invention generally relates to data processing systems and more particularly to data processing operations provided over a common input/output bus.

In a system having a plurality of devices coupled over a common bus an orderly system must be provided by which bidirectional transfer of information may be provided between such devices. This problem becomes more complicated when such devices include for example one or more data processors, one or more memory units and various types of peripheral devices, such as magnetic tape storage devices, disk storage devices, card reading equipment, and the like.

Various methods and apparatus are known in the prior art for interconnecting such a system. Such prior art systems range from those having common data bus paths to those which have special paths between various devices. Such systems also may include a capability for either synchronous or asynchronous operation in combination with the bus type. Some of such systems, independent of the manner in which such devices are connected or operate, require the central processor's control of any such data transfer on the bus even though for example the transfer may be between devices other than the central processor. In addition, such systems normally include various parity checking apparatus, priority schemes and interrupt structures. One such structural scheme is shown in U.S. Pat. No. 3,866,181. Another is shown in U.S. Pat. No. 3,676,860. A data processing system utilizing a common bus is shown in U.S. Pat. No. 3,815,099. The manner in which addressing is provided in such systems as well as the manner in which for example any one of the devices may control the data transfer is dependent upon the implementation of the system, i.e., whether there is a common bus, whether the operation thereof is synchronous or asynchronous, etc. The system's response and throughput capability is greatly dependent on these various structures.

A particular structural scheme is shown in U.S. Pat. Nos. 3,993,981, 3,995,258, 3,997,896, 4,000,485, 4,001,790 and 4,030,075 which describe an asynchronously operated common bus. The present invention is an improvement thereon in which the system throughput capabilities are improved by allowing a device on the common data bus to request that another device on the common data bus provide the requesting device with multiple words of information. The present invention provides for the multiple word request to be made in a single bus cycle and the requested information to be provided in a series of responding bus cycles. This method increases system throughput by reducing the number of bus request cycles that would otherwise be required. Other data processing systems, although allowing for multiple words to be requested, require that the data bus be as wide as the number of words to be returned in a single response cycle. In the present invention, the common data bus need only be one word wide and multiple response cycles are provided to deliver one word of requested information during each response cycle.

It is accordingly a primary objective of the present invention to provide an improved data processing system having a plurality of devices, including the central processor, connected to a common bus in a manner that permits a device during one bus cycle to request multiple words of information be delivered by another device during a series of response bus cycles.

SUMMARY OF THE INVENTION

The above and other objects of the invention are obtained by providing a system comprising a plurality of units coupled to transfer information over a common bus between any two of the units during asynchronously generated information transfer cycles. A first one of the units includes apparatus for enabling the transfer of first information to a second one of the units during a first transfer cycle. The first such information indicates a request for a second unit to transfer information to the first unit during a plurality of further transfer cycles. Apparatus is included in the second unit which, in response to the first information enables the transfer of the requested information to the first unit during a series of later transfer cycles asynchronously generated at points in time following the first transfer cycle. Further apparatus is provided in each of the units for enabling the transfer of information between any two units except the first and second units during an additional transfer cycle generated between the time the first transfer cycle and the last transfer cycle are generated.

BRIEF DESCRIPTION OF THE DRAWINGS

The manner in which the apparatus of the present invention is constructed and its mode of operation can best be understood in the light of the following detailed description, together with the accompanying drawings, in which.

DETAILED DESCRIPTION OF THE PREFERRED EMBODIMENT

Figure 1:
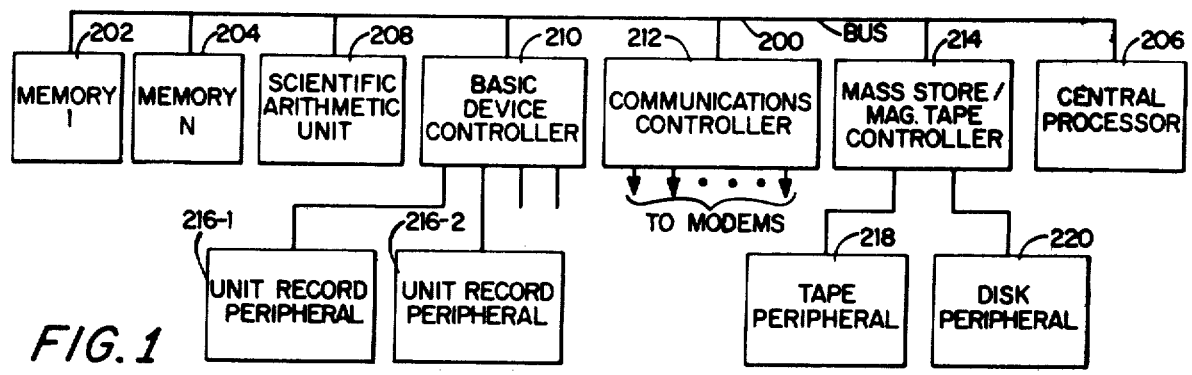
FIG. 1 is a general block diagram illustration of the present invention.

The common bus of the present invention provides a communication path between two units in the system. The bus is asynchronous in design enabling units of various speeds connected to the bus to operate efficiently in the same system. The design of the bus used in the present invention permits communications including memory transfers, interrupts, data, status and command transfers. The overall configuration of a typical system is shown in FIG. 1.

BUS REQUEST AND RESPONSE CYCLES

The bus permits any two units to communicate with each other at a given time via common (shared) signal path. Any unit wishing to communicate, requests a bus cycle. When that bus cycle is granted, that unit becomes the master and may address any other unit in the system as the slave. Most transfers are in the direction of master to slave. Some types of bus interchange require a response cycle (a single fetch memory read, for example). In cases where a response cycle is required, the requestor assumes the role of master, indicates that a response is required, and identifies itself to the slave. When the required information becomes available, (depending on slave response time), the slave then assumes the role of master, and initiates a transfer to the requesting unit. This completes the single fetch interchange which has taken two bus cycles in this case. Intervening time on the bus between these two cycles (the request cycle and the response cycle) may be used for other system traffic not involving these two units.

Some types of bus interchange require two response cycles (a double fetch memory read, for example). In cases where two response cycles are required, the requesting unit assumes the role of master, indicates that two responses (one response for each word to be transferred) are required by setting a double fetch indicator, and identifies itself to the slave. Before initiating the first response cycle, the slave verifies that both the first and second words of information are present within the responding unit (slave). When the first word of the required information becomes available (depending on the slave response time), the slave then assumes the role of master and initiates a transfer to the requesting unit. If both words are present in the responding unit, during the first response cycle, the responding unit indicates to the requesting unit, by again setting the double fetch indicator, that this is the first response cycle of two response cycles and that a second response cycle will follow. When the second word of the required information becomes available, the slave again assumes the role of master and initiates a transfer to the requesting unit. During the second response cycle, the responding unit does not set the double fetch indicator, thereby indicating to the requesting unit that this is the last response cycle. This completes the double fetch interchange which has taken three bus cycles in this case. Intervening time on the bus between any two of these three cycles may be used for other traffic not involving these two units.

In the case of a double fetch request where only the first word is present in the responding unit, when the information becomes available the responding unit replies with a single response cycle in which the double fetch indicator is not set indicating to the requesting unit that the first response cycle will be the last response cycle. This completes the interchange which has taken two bus cycles (a request cycle and a single response cycle) in this case. If the unit that originated the double fetch request still desires the second word of information, the requesting unit must initiate a request cycle and in the case of a memory read provide the address of the desired second word. This second request, which may be either a single or double fetch request, will be responded to by a slave unit that contains the first word of information requested in the second request.

BUS SIGNALS AND TIMING

Figure 2:
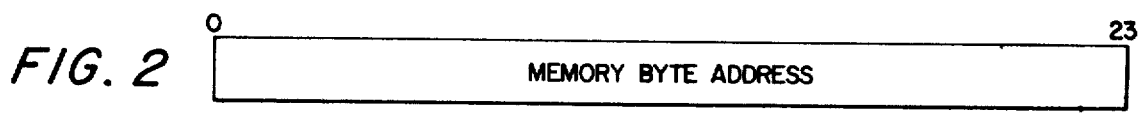
FIGS. 2 through 6 illustrate the format of various information transferred over the common bus of the present invention.
Figure 3:
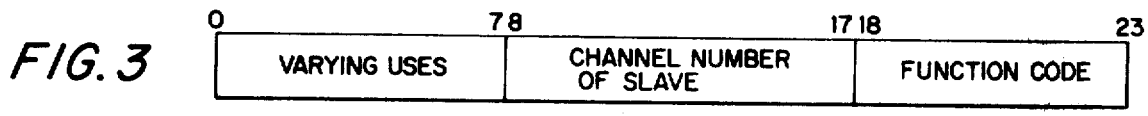

A master may address any other unit on the bus as a slave. It does this by placing the slave address on the address leads. There may be 24 address leads for example which can have either of two interpretations depending on the state of an accompanying control lead called the memory reference signal (BSMREF). If the memory reference signal is a binary ZERO, the format of FIG. 2 applies to the address leads with the 24th such lead being the least significant bit. It should be noted that as used in this specification, the terms binary ZERO and binary ONE are used respectively to refer to the low and high states of electrical signals. If the memory reference signal is a binary ONE, the format for such 24 bits as shown in FIG. 3 applies. In essence, when the memory is being addressed, the bus enables up to $2^{24}$ bytes to be directly addressed in memory. When units are passing control information, data or interrupts, they address each other by channel number. The channel number allows up to $2^{10}$ channels to be addressed by the bus. Along with the channel number, a six bit function code is passed which specifies which of up to $2^6$ possible functions this transfer implies.

Figure 4:

When a master requires a response cycle from the slave, it indicates this to the slave by one state (read command) of a control lead named BSWRITE— (the other state thereof not requiring a response, i.e., a write command). In this case, the master provides its own identity to the slave by means of a channel number. The data leads, as opposed to the bus address leads, are coded in accordance with the format of FIG. 4 to indicate the master's identity when a response is required from the slave. The response cycle is directed to the requestor by a non-memory reference transfer. The control lead, indicated as a second-half bus cycle (BSSHBC—), is enabled to designate that this is the awaited cycle (as compared to an unsolicited transfer from another unit). When a master requires a double fetch from a slave, it indicates this to the salve by one state of a control lead named, BSDBPL— (the other state thereof not requiring a double fetch, i.e., a single fetch). When the slave responds to the master's request, one state of this same control lead (BSDBPL—) is used to indicate to the requesting unit that this response cycle is the first reponse cycle of two response cycles (the other state thereof indicating that this is the last response cycle of a double fetch operation).

Figure 8:
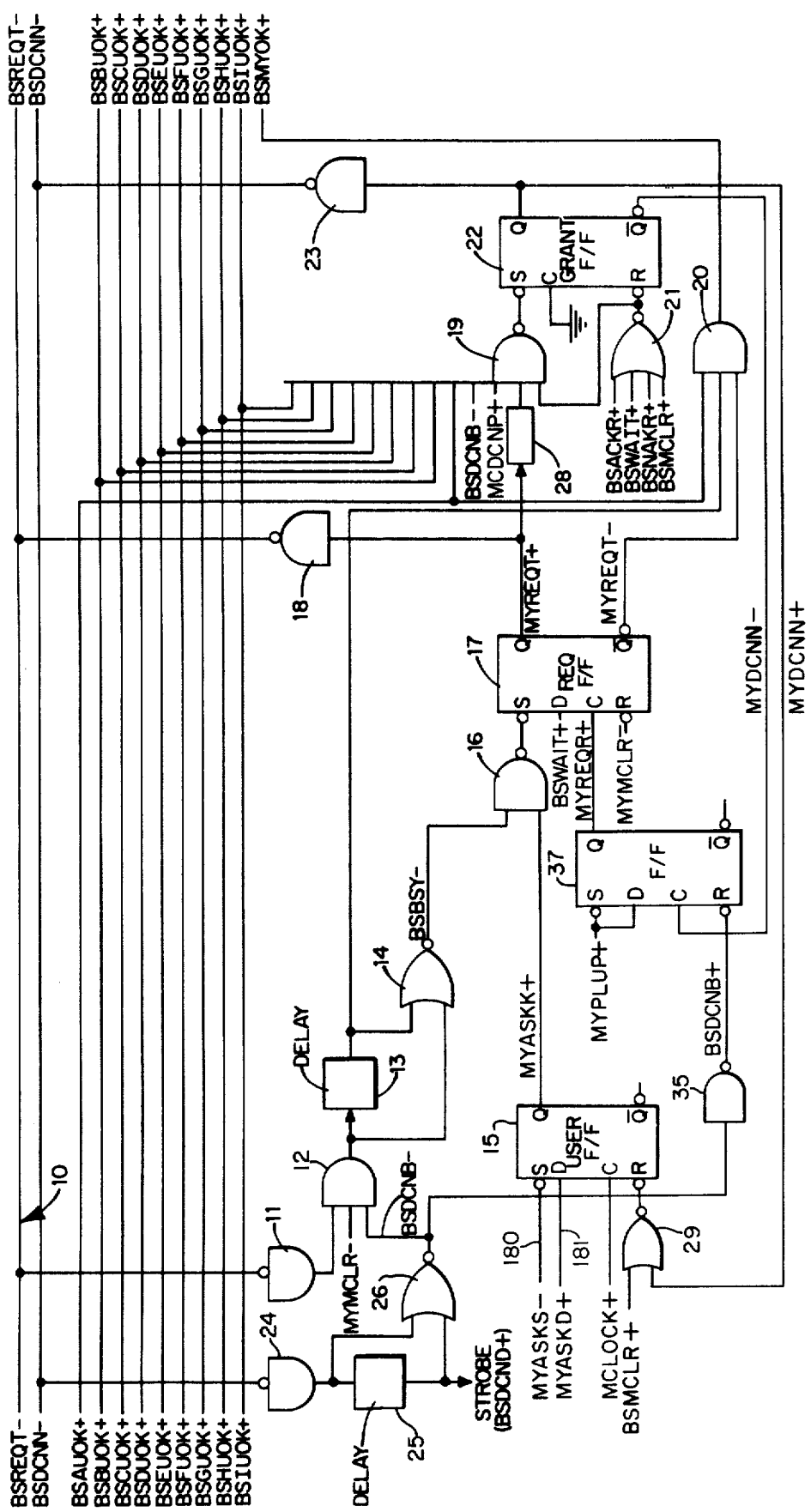
FIG. 8 illustrates a logic diagram of the central processor priority network of the present invention.

The distributed tie-breaking network provides the function of granting bus cycles and resolving simultaneous requests for use of the bus. Priority is granted on the basis of physical position on the bus, the highest priority being given to the first unit on the bus. The logic to accomplish the tie-breaking function is distributed among all units connected to the bus and is fully described in U.S. Pat. No. 4,030,075 and an improvement thereof described in U.S. Pat. No. 4,096,569, both of which are incorporated herein by reference. In a typical system, the memory is granted the highest priority and the central processor is granted the lowest priority with the other units being positioned on the basis of their performance requirements. The logic to accomplish the tie-breaking function for the central processor is shown in FIG. 8 and for the memory in FIG. 9.

Thus, referring to FIG. 1, a typical system of the present invention includes a multiline bus 200 coupled with memory 1-202 through N-204, such memories having the highest priority and with the central processor 206 having the lowest priority. Also connected on the bus may be included for example a scientific arithmetic unit 208 and various controllers 210, 212 and 214. Controller 210 may be coupled to control for example four unit record peripheral devices 216. Controller 212 may be used to provide communications control via modem devices whereas controller 214 may be utilized to control mass storage devices such as a tape peripheral device 218 or a disk peripheral device 220. As previously discussed, any one of the devices coupled with the bus 200 may address a memory or any other unit connected to the bus. Thus tape peripheral 218 may, via controller 214, address memory 202.

As shall be hereinafter discussed, each of such units directly connected to the bus includes a tie-breaking logic as illustrated and discussed in U.S. Pat. No. 4,030,075 and an improvement thereof described in U.S. Pat. No. 4,096,569 and further each one of such units includes address logic as discussed with reference to FIGS. 9 and 9A for typical double fetch memory address logic and FIGS. 11 and 11A for typical double fetch central processor address logic. The address logic for a typical basic device controller is also discussed in U.S. Pat. No. 4,030,075. Units not directly connected to the bus, such as units 216, 218 and 220, also have tie-breaking logic.

A channel number will exist for every end point in a particular system, with the exception of the memory type processing elements which are identified by the memory address. A channel number is assigned for each such device. Full duplex devices as well as half-duplex devices utilize two channel numbers. Output only or input only devices use only one channel number each. Channel numbers are easily variable and accordingly one or more hexadecimal rotary switches (thumb wheel switch) may be utilized for each such unit connected with the bus to indicate or set the unit's address. Thus when a system is configured, the channel number may be designated for the particular unit connected to the bus as may be appropriate for that particular system. Units with multiple input/output (I/O) ports generally will require a block of consecutive channel numbers. By way of example, a four port unit may use rotary switches to assign the upper 7 bits of a channel number and may use the lower order 3 bits thereof to define the port number and to distinguish input ports from output ports. The channel number of the slave unit will appear on the address bus for all non-memory transfers as shown in FIG. 3. Each unit compares that number with its own internally stored number (internally stored by means of the rotary switches). The unit which achieves a compare is, by definition, the slave, and must respond to that cycle. Generally, no two points in a single system will be assigned to the same channel number. As shown in FIG. 3, a specific bus or I/O function can be performed as indicated by bits 18 through 23 of the bus address leads for non-memory transfers. Function codes may designate output or input operations. All odd function codes designate output transfers (write) while all even function codes designate input transfer requests (read). For example, a function code of 00 (base 16) may be used to indicate a single fetch memory read and a function code of 20 (base 16) may be used to indicate a double fetch read operation. The central processor examines the least significant bit, 23, of the 6 bit function code field for an input/output command and uses a bus lead to designate the direction.

Figure 5:
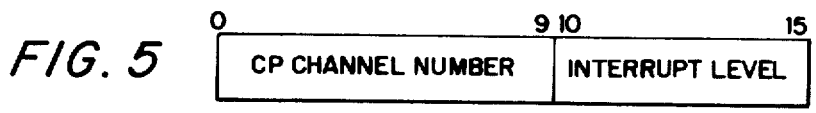

There are various output and input functions. One of the output functions is a command whereby a data quantity, for example 16 bits is loaded into the channel from the bus. The meanings of the individual data bits are component specific, but the data quantity is taken to mean the data to be stored, sent, transmitted, etc., depending upon the specific component functionality. Another such output function is a command whereby for example a 24 bit quantity is loaded into a channel address register (not shown). The address is a memory byte address and refers to the starting location in memory where the channel will commence input or output of data. Various other output functions include an output range command which defines the size of the memory buffer assigned to the channel for a specific transfer, an output control command which by its individual bits causes specific responses, output task functions such as print commands, output configuration which is a command to indicate functions such as terminal speed, card read mode, etc., and output interrupt control which is a command which loads for example a 16 bit word into the channel with the format as shown in FIG. 5. The first 10 bits indicate the central processor channel number and bits 10 through 15 indicate the interrupt level. Upon interrupt, the central processor channel number is returned on the address bus while the interrupt level is returned on the data bus.

The input functions include functions similar to the output functions except in this case the input data is transferred from the device to the bus. Thus, input functions include the input data, input address and input range commands as well as the task configuration and input commands. In addition, there is included the device identification command whereby the channel places its device identification number on the bus. Also included are two input commands whereby a status word 1 or a status word 2 is placed on the bus from the channel as presently discussed.

The indication from status word 1 may include for example whether or not the specific device is operational, whether it is ready to accept information from the bus, whether there is an error status or whether attention is required. Status word 2 may include for example an indication of parity, whether there is a non-correctable memory or a corrected memory error, whether there is a legal command or for example whether there is a non-existent device or resource.

Figure 6:

As previously discussed, a unique device identification number is assigned to every different type of device which is connected to the bus. This number is presented on the bus in response to the input function command entitled input device identification. This number is placed on the data bus in the format shown in FIG. 6. For convenience, the number is separated into 13 bits identifying the device (bits 0 through 12) and three bits identifying certain functionality of the device (bits 13 through 15) as may be required.

Figure 7:
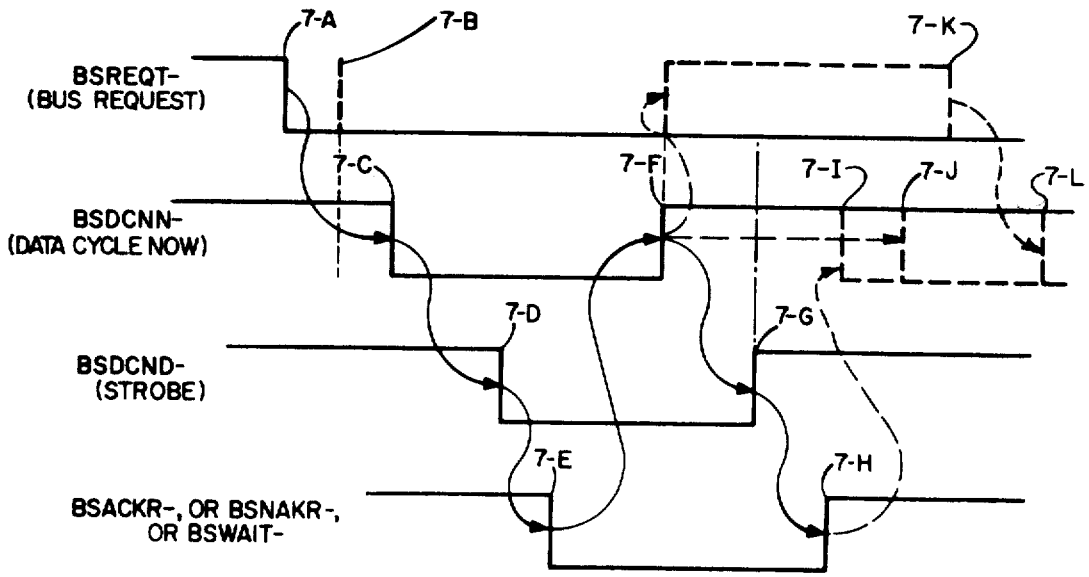
FIG. 7 illustrates a timing diagram of the operation of the bus of the present invention.
Figure 9:
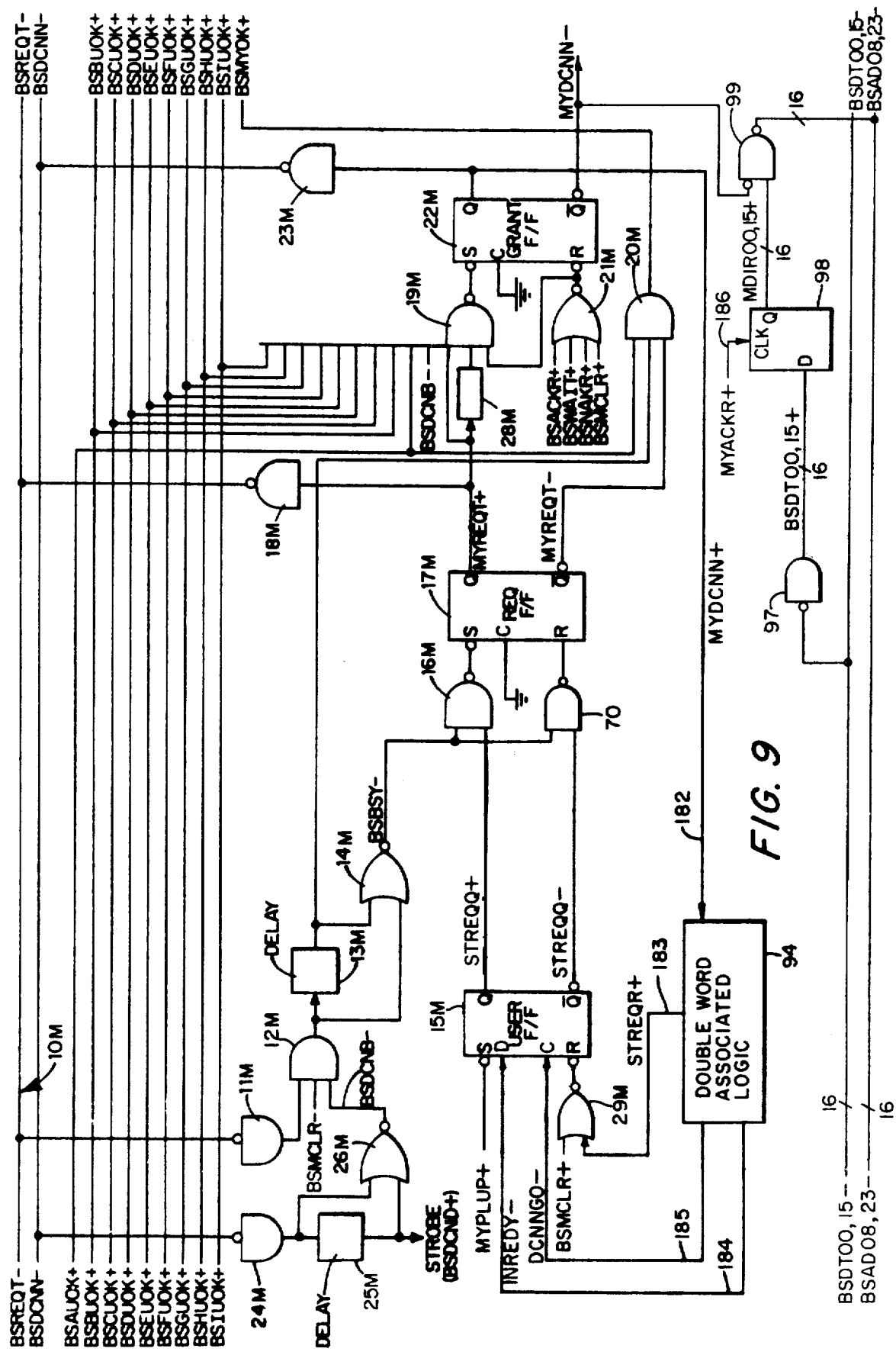
FIGS. 9 and 9A illustrate a logic diagram of the memory controller priority network of the present invention.

A unit wishing to interrupt the central processor requests a bus cycle. When this bus cycle is granted, the unit places its interrupt vector on the bus, the interrupt vector including the channel number of the central processor and the interrupt level number. The unit thus provides, as its interrupt vector, the master's channel number and its interrupt level number. If this is the central processor's channel number, the central processor will accept the interrupt if the level presented is numerically smaller than the current internal central processor level and if the central processor has not just accepted another interrupt. Acceptance is indicated by a bus ACK signal (BSACKR—). If the central processor cannot accept the interrupt, a NAK signal is returned (BSNAKR—). Devices receiving a NAK (sometimes referred to as NACK) signal will retry when a signal indicating resume normal interrupting is received from the central processor (BSRINT—). The central processor issues this signal when it has completed a level change and therefore may be capable of accepting interrupts once again. The channel number of the master is supplied in the vector for use since more than one channel may be at the same interrupt level. Interrupt level 0 is of special significance since it is defined to mean that the unit shall not interrupt. FIG. 7 illustrates the bus timing diagram and will be discussed more specifically hereinafter. Generally, however the timing is a follows. The timing applies to all transfers from a master unit to a slave unit connected to the bus. The speed at which the transfer can occur is dependent upon the configuration of the system. That is, the more units connected to the bus and the longer the bus, then, due to propagation delays, the longer it takes to communicate on the bus. On the other hand, the lesser amount of units on the bus decreases the response time. Accordingly the bus timing is truly asynchronous in nature. A master which wishes a bus cycle makes a bus request. The signal BSREQT— is common to all units on the bus and if a binary ZERO, indicates that at least one unit is requesting a bus cycle. When the bus cycle is granted, the signal BSDCNN— becomes a binary ZERO indicating that a tie-breaking function as more specifically discussed with respect to FIGS. 8 and 9 is complete and that one specific master now has control of the bus. At the time the signal BSDCNN— becomes a binary ZERO, the master applies the information to be transferred to the bus. Each unit on the bus develops an internal strobe from the signal BSDCNN—. The strobe is delayed for example approximately 60 nano-seconds from the reception of the binary ZERO state of the BSDCNN— signal. When the delay is complete in the slave, the bus propagation time variations will have been accounted for and each slave unit would have been able to recognize its address (memory address or channel number). The addressed slave can now make one of these responses, either an ACK, NAK or a WAIT signal or more specifically a BSACKR—, a BSNAKR— or a BSWAIT— signal. The response is sent out on the bus and serves as a signal to the master that the slave has recognized the requested action. The control lines then return to the binary ONE state in the sequence as shown in FIG. 7. Thus the bus handshake is fully asynchronous and each transition will only occur when the preceding transition has been received. Individual units may therefore take different lengths of time between the strobe and the ACK, etc., transition depending on their internal functionality. A bus timeout function exists to prevent hang ups which could occur.

Information which is transferred over the bus can include for example 50 signals or bits, which may be broken down as follows: 24 address bits, 16 data bits, 5 control bits and 5 integrity bits. These various signals will be discussed hereinafter.

The tie-breaking function, more specifically described with respect to FIGS. 8 and 9 is that of resolving simultaneous requests from different units for service and granting bus cycles on a basis of a positional priority system. As indicated hereinbefore, the memory has the highest priority and the central processor has the lowest priority and they reside physically at opposite ends of the bus 200. Other units occupy intermediate positions and have priority which increases relative to their proximity to the memory end of the bus. The priority logic is included in each one of the units directly connected to the bus in order to accomplish the tie-breaking function. Each such unit's priority network includes a grant flip-flop. At any point in time, only one specific grant flip-flop may be set and that unit by definition is the master for that specific bus cycle. Any unit may make a user request at any time thus setting its user flip-flop. At any time therefore, many user flip-flops may be set, each representing a future bus cycle. In addition, each unit on the bus contains a request flip-flop. When all units are considered together, the request flip-flops may be considered as a request register. It is the outputs of this register that supply the tie-breaking network which functions to set only one grant flip-flop no matter how many requests are pending. More specifically, if there were no pending requests then no request flip-flops would be set. The first user flip-flops to set would cause its request flip-flop to set. This in turn would inhibit, after a short delay as hereinafter described, other devices from setting their request flip-flops. Thus what occurs is that a snap-shot of all user requests is taken for the given period in time (the delay period). The result is that a number of request flip-flops may be set during this delay period depending upon their arrival. In order to allow the request flip-flops to have their outputs become stable, each unit includes such delay in order to insure that such stabilization has occurred. A particular grant flip-flop is set if the unit associated therewith has had its request flip-flop set and the delay time has elapsed and no higher priority unit wants the bus cycle. A strobe signal is then generated after another delay period and finally the grant flip-flop is cleared (reset) when the master receives an ACK, NAK or WAIT signal from the slave unit.

As indicated hereinbefore, there are three possible slave responses, the ACK, the WAIT or the NAK signal. In addition, there is a fourth state in which there is no response at all. In the case where no unit on the bus recognizes the transfer as addressed to it, no response will be forthcoming. A time out function will then take place and a NAK signal will be received thereby clearing the bus. An ACK signal will be generated if the slave is capable of accepting the bus transfer from the master and wishes to do so. The WAIT response is generated by the slave if the slave is temporarily busy and cannot accept a transfer at this time. Upon receipt of the WAIT signal, the master will retry the cycle at the next bus cycle granted to it and continue to do so until successful. Some of the causes of a WAIT response from a slave, when the central processor is the master, are for example, when the memory is a slave and the memory is responding to a request from another unit or when a controller is a slave, for example, if the controller is waiting for a response from memory or if the controller has not yet processed the previous input/output command. The NAK signal indicated by the slave means it accept a transfer at this time. Upon receipt of a NAK signal, a master unit will not immediately retry but will take specific action depending upon the type of master.

As generally indicated hereinbefore, there are basic timing signals on the bus which accomplish the handshaking function thereof. These five signals, as discussed hereinbefore, are bus request signal (BSREQT−) which when a binary ZERO indicates that one or more units on the bus have requested the bus cycle; the data cycle now signal (BSDCNN−) which when a binary ZERO indicates a specific master is making a bus transfer and has placed information on the bus for use by some specific slave; the ACK signal (BSACKR−) which is a signal generated by the slave to the master that the slave is accepting this transfer by making this signal a binary ZERO; the NAK signal (BSNAKR−) which is a signal generated by the slave to the master indicating when it is a binary ZERO that is refusing this transfer; and the WAIT signal (BSWAIT−) which is a signal generated by the slave to the master indicating when it is a binary ZERO that the slave is postponing the decision on the transfer.

In addition and as indicated hereinbefore, there may be as much as fifty information signals which are transferred as the information content of each bus cycle. These signals are valid for use by the slave on the leading edge of the strobe signal. All of the following discussion is by way of example and it should be understood that the number of bits may be changed for different functions. Thus, there may be 16 leads or bits provided for the data and more particularly signals BSDT00− through BSDT15−. There are 24 leads provided for the address, more particularly signals BSAD00− through BSAD23−. There is one bit provided for the memory reference signal (BSMREF−) which when a binary ZERO indicates that the address leads contain a memory address. When the memory reference signal is a binary ONE it indicates that the address leads contain a channel address and a function code as indicated in FIG. 3. There is also provided a byte signal (BSBYTE−) which indicates when it is a binary ZERO that the current transfer is a byte transfer rather than a word transfer, a word typically comprising two bytes. There is also a write signal (BSWRIT−) which indicates when it is a binary ONE that the slave is being requested to supply information to the master. A separate bus transfer will provide this information. There is further provided a second-half bus cycle signal (BSSHBC−) which is used by the master to indicate to the slave that this is the information previously requested. From the time a pair of units on the bus have started a read operation (indicated by the signal BSWRIT−) until the second cycle occurs to complete the transfer (indicated by BSSHBC−) both units may be busy to all other units on the bus. There is also included a double fetch signal among the 50 information signals on the bus. The double fetch signal (BSDBPL−) is used to cause a double fetch operation (BSDBPL−) to occur. This is a multi-cycle bus transfer whereby a master unit, in a single request cycle, requests two words of information from a slave unit. The slave unit responds to the double fetch request by providing two response cycles, one for each word of data requested. This reduces traffic on the bus by providing the master with two words of information in three bus cycles (a request cycle, a first response cycle, and a second response cycle) in contrast to the four bus cycles (first request cycle, a first response cycle, a second request cycle and a second response cycle) required if two single fetch operations were performed. An example of the double fetch operation is the central processor requesting two words from memory, the three bus cycles of which are as follows. During the first bus cycle, the request cycle, the signal BSMREF− is a binary ZERO indicating the address bus contains the memory address of the first word, the data bus contains the channel number of the central processor, the signal BSWRIT− is a binary ONE indicating a response (memory read) is required, the signal BSDBPL− is a binary ZERO indicating that this is a double fetch operation and further the signal BSSHBC− is a binary ONE indicating that this is not a second-half bus cycle. During the second bus cycle of the double fetch operation, the address bus contains the channel number of the central processor, the data bus contains the first word of memory data, the BSSHBC− signal is a binary ZERO denoting a second-half bus cycle (read response), the BSDBPL− signal is a binary ZERO indicating that this is the first response cycle and that a second response cycle will follow, the BSMREF− signal is a binary ONE and the BSWRIT− signal is not set by memory and therefore is a binary ONE. During the third bus cycle, the second response cycle, the address bus contains the channel number of the central processor, the data bus contains the second word of memory data, the BSSHBC− signal is a binary ZERO denoting a read response, the BSDBPL− signal is a binary ONE indicating that this is the last response cycle, the BSMREF− signal is a binary ONE, and the BSWRIT− signal is a binary ONE. As in all other operations, the intervening time on the bus between any two of the three bus cycles of the double fetch operation may be used by other units not involved in the transfer.

In addition to miscellaneous error and parity signals, there is also included a lock signal among the fifty information signals on the bus. The lock signal (BSLOCK−) is used to cause a lock operation to occur. This is a multi-cycle bus transfer whereby a unit may read or write a word or multi-word area of memory without any other unit being able to break into the operation with another lock command. This facilitates the connection of the system into a multiprocessing system. The effect of the lock operation is to extend a busy condition beyond the duration of the memory cycle for certain types of operations. Other units attempting to initiate lock signals before the last cycle is complete will receive a NAK response. The memory will however still respond to other memory requests. An example of the lock operation is the read modify write cycle, the three bus cycles of which are as follows. During the first bus cycle, the address bus contains the memory address, the data bus contains the channel number of the originator, the signal BSWRIT— is a binary ONE indicating a response is required, the signal BSLOCK— is a binary ZERO and the signal BSSHBC— is a binary ONE indicating that this is a lock operation and further the BSMREF— signal is a binary ZERO. During the second bus cycle of the read modify write operation, the address bus contains the channel number of the originator, the data bus contains the memory data, the BSSHBC— signal is a binary ZERO denoting a read response and the BSMREF— signal is a binary ONE. During the third bus cycle, the address bus contains the memory address, the data bus contains the memory data, the BSLOCK— signal is a binary ZERO and the BSSHBC— sign is a binary ZERO indicating the completion of the read modify write (locked) operation and the BSMREF— signal is a binary ZERO. In addition the BSWRIT— signal is a binary ZERO indicating no response is required. As in all other operations, the intervening time on the bus between any two of the three bus cycles of the read modify write operation may be used by other units not involved in the transfer.

In addition to the other control signals, also provided on the bus may be the bus clear (BSMCLR—) signal which is normally a binary ONE and which becomes a binary ZERO when the master clear button which may be located on the central processor's maintenance panel, is actuated. The bus clear signal may also become a binary ZERO during a power up sequence for example. The resume interrupting signal (BSRINT—) is a pulse of short duration which is issued by the central processor whenever it completes a level change. When this signal is received, each slave unit which had previously interrupted and had been refused, will reissue the interrupt.

The timing diagram of FIG. 7 will now be more specifically discussed in detail with respect to the address logic circuitry of the memory and the central processing unit.

With reference to the timing diagram of FIG. 7 in every bus cycle there are three identifiable parts, more particularly, the period (7-A to 7-C) during which the highest priority requesting device wins the bus, the period (7-C to 7-E) during which the master unit calls a slave unit, and the period (7-E to 7-G) during which the slave responds. When the bus is idle the bus request signal (BSREQT—) is a binary ONE. The bus request signal's negative going edge at time 7-A starts a priority net cycle. There is an asynchronous delay allowed within the system for the priority net to settle (at time 7-B) and a master user of the bus to be selected. The next signal on the bus is the BSDCNN— or data cycle now signal. The BSDCN— signal's transition to a binary ZERO at time 7-C means that use of the bus has been granted to a master unit. Thereafter, the second phase of bus operation means the master has been selected and is now free to transfer information on the data, address and control leads of the bus 200 to a slave unit that the master so designates.

The slave unit prepares to initiate the third phase of bus operation beginning at the negative going edge of the strobe or BSDCND— signal. The strobe signal is delayed, for example, sixty (60) nanoseconds from the negative going edge of BSDCNN— signal by delay line 25 of FIG. 8. Upon the occurrence of the negative going edge of BSDCND— signal at time 7-D, the slave unit can now test to see if this is his address and if he is being called to start the decision making process of what response to generate. Typically, this will cause an acknowledge signal (BSACKR—) to be generated by the slave unit or in the non-typical cases a BSNAKR— or BSWAIT— signal or even no response at all (for the case of a non-existent slave) may be generated as herein described. The negative going edge of the acknowledge signal at time 7-E when received by the master unit, causes the master's BSDCNN— signal to go to a binary ONE at time 7-F. The strobe signal returns to the binary ONE state at time 7-G which is a delay provided by delay line 25 from time 7-F. Thus, in the third phase of bus operation, the data and address on the bus are stored by the slave unit and the bus cycle will begin to turn off. The ending of the cycle, i.e., when BSDCNN— goes to a binary ONE, dynamically enables another priority net resolution. A bus request signal may, at this time, be generated and if not received this means that the bus will return to the idle state, and accordingly the BSREQT— signal would go to the binary ONE state. If the bus request signal is present at that time, i.e., a binary ZERO as shown, it will start the asynchronous priority net selection process following which another negative going edge of the BSDCNN— signal will be enabled as shown by the dotted lines as times 7-I and 7-J. It should be noted that this priority net resolution need not wait or be triggered by the positive going edge of the acknowledge signal at time 7-H, but may in fact be triggered at a time 7-F just following the transition of the bus to an idle state if thereafter a unit desires a bus cycle. Although the priority net resolution can be triggered at time 7-F by the positive going edge of the BSDCNN— signal, the second negative going edge of the BSDCNN— signal, in response to the setting of grant flip-flop 22 of FIG. 8, must await the positive going edge of the acknowledge signal at time 7-H, i.e., the binary ZERO from NOR gate 21 of FIG. 8, must be removed from the reset input of grant flip-flop 22. The negative going edge of the BSDCNN— signal at time 7-I illustrates the case where the priority net resolution is triggered at time 7-F and the resolution occurs before time 7-H. The negative going edge of the BSDCNN— signal at time 7-J illustrates the case where the acknowledge signal clears before the resolution of the priority net. The negative going edge of the BSDCNN— signal at time 7-L illustrates the case where there is no bus request at time 7-F and the priority net resolution is triggered by a later bus request signal BSREQT— at time 7-K. This process repeats in an asynchronous manner.

DOUBLE FETCH OPERATION

The double fetch memory operation will now be discussed in detail by way of example. In the example, the central processor will make a double fetch request of memory, and the three bus cycles associated with the request and response will be examined. During the first bus cycle, the central processor is the master and the memory is the slave. During this first cycle, the central processor bids for the bus using the priority network logic of FIG. 8 and the memory controller responds using the bus interface logic of FIG. 10. During the second and third bus cycles, in which the memory controller is the master and the central processor is the slave, the memory bids for the bus using the priority network logic of FIG. 9 and the central processor responds using the bus interface logic of FIG. 11 and 11A.

DOUBLE FETCH OPERATION REQUEST CYCLE

The first bus cycle, the double fetch request cycle, will now be discussed with respect to FIGS. 8 and 10.

CENTRAL PROCESSOR PRIORITY NETWORK LOGIC

Now referring to the priority net logic of FIG. 8, the priority net cycle is initially in an idle state and the bus request signal (BSREQT−) on line 10 is a binary ONE. When this bus request signal is a binary ONE, the output of receiver (inverting amplifier) 11 will be a binary ZERO. The output of receiver 11 is coupled to one input of AND gate 12. The other inputs to gate 12 are the master clear signal (MYMCLR−) which is normally a binary ONE and the output of NOR gate 26 which is normally a binary ONE also. The output of gate 12, during the bus idle state is thus a binary ZERO, and thus the output of the delay line 13 will be a binary ZERO. The input and the output of the delay line 13 being a binary ZERO allows the output of NOR gate 14 (BSBSY−) to be a binary ONE. When one of the units connected to the bus desires a bus cycle, it asynchronously sets its user flip-flop 15 so that its Q output (MYASKK+) is a binary ONE.

Thus, with the bus in the idle state, the first event that occurs as the bus goes to the busy state is that the user sets its user flip-flop 15. In the case of the central processor, user flip-flop 15 can be set by a binary ONE, signal MYASKD+ on line 181 from FIG. 11A, being clocked to the outputs thereof by central processor clocking signal MCLOCK+ transitioning from the binary ZERO to the binary ONE state, or by a binary ZERO, signal MYASKS− on line 180 from FIG. 11A, at the set input thereof. Signal MYASKD+ and MYASKS− are discussed hereinafter in referece to FIG. 11A. When both inputs to NAND gate 16 are a binary ONE state, the output thereof is a binary ZERO. This sets the request flip-flop 17 so that its Q output (MYREQT+) is a binary ONE. Thus, in an asynchronous manner, the Q output of request flip-flop 17 will be a binary ONE. This operation can be coincidentally occurring in the similar logic of the other units connected with the bus.

the binary ONE state of the MYREQT+ signal will be placed on line 10 of the bus via driver 18 as a binary ZERO. Thus referring to the timing diagram of FIG. 7, the BSREQT− signal goes negative or to a binary ZERO state. Any request to the system from any one of the request flip-flops 17 of the various units connected to the bus will thus hold line 10 in the binary ZERO state. The delay line 13 includes sufficient delay to compensate for the propagation delay encountered by elements 14, 16 and 17. Thus, even though a device sets its request flip-flop 17, this does not mean that a higher priority device, which also requests a bus cycle, will not take the next bus cycle. For example, if a lower priority device sets its request flip-flop 17, the binary ZERO signal on line 10 is fed back to all devices, including the higher priority device, which in turn generates a binary ONE state at the output of its gate 12 so as to generate a binary ZERO state at the output of NOR gate 14, thereby disabling the setting of the request flip-flop 17 of such other higher priority device, if in fact the user flip-flop 15 of such higher priority device had not already been set. Once the delay time of, for example, 20 nanoseconds has expired and the output of delay line 13 of such higher priority device is now a binary ONE state, then the output of gate 14 will be a binary ZERO state so that independent of whether or not the user flip-flop 15 of such higher priority device has been set, the output of gate 16 will be a binary ONE thereby disabling the setting of request flip-flop 17. Thus during such time frame, all devices have their request flip-flop 17 set if in fact they are requesting service as indicated by the setting of their user flip-flop 15. After the delay time provided by element 13 of the device first requesting a bus cycle, a device not having had its request flip-flop 17 set cannot do so until after the priority cycle is completed. Thus the higher priority device will win the bus even if its user flip-flop is set a few nanoseconds after the lower priority device sets its flip-flop.

Thus, all of the request flip-flops 17 for devices seeking bus cycle will have been set during such interval as indicated by the delay line arrangement of delay line 13. Notwithstanding that many of such devices coupled with the bus may have their request flip-flops set during such time interval, only one such device may have its grant flip-flop 22 set. The device that has its grant flip-flop 22 set will be the highest priority device seeking the bus cycle. When such highest priority device seeking a bus cycle has completed its operation during such bus cycle, the other devices which have their request flip-flops set, will again seek the next such bus cycle and so on. Thus the Q output of request flip-flop 17 in addition to being coupled to driver 18 is also coupled to one input of NAND gate 19 via element 28. Element 28 is no more than a direct connection for each unit's priority logic, except that unit (usually the memory 202) which is coupled to the highest priority end of the bus 200, in which sole case element 28 is a delay element as explained hereinafter. The Q̄ output (MYREQT−) of flip-flop 17 is coupled to one input of AND gate 20. The other inputs to gate 19 are received from the higher priority devices and more particularly, for example, nine preceding higher priority devices. These signals received from the higher priority devices are shown to be received from the left-hand side of FIG. 8 as signals BSAUOK+ through BSIUOK+. If any one of such nine signals is a binary ZERO, this will mean that a higher priority device has requested a bus cycle and accordingly this will inhibit the current device from having its grant flip-flop set and thereby disable it from having the next bus cycle.

The other inputs received by gate 19 are from the NOR gate 26, i.e., the BSDCNB− signal and the output of NOR gate 21. In addition, a user ready signal, i.e., the MCDCNP+ signal in the case of the central processor, may be received from the particular unit's other logic by which, the particular unit, even though requesting a bus cycle, may delay it by changing the user ready signal to the binary ZERO state. That is, the unit even though not ready for a bus cycle may request it and set the user ready signal to a binary ZERO, in anticipation that it will be ready by the time the bus cycle is granted. The output of NOR gate 26 is normally a binary ONE and if all other inputs to gate 19 are a binary ONE, then grant flip-flop 22 will be set. The other input from gate 21 is a binary ONE when the bus is in an idle state. The inputs to NOR gate 21 are the BSACKR+ signal, the BSWAIT+ signal, the BSNAKR+ signal and the BSMCLR+ signal. If any one of these signals is a binary ONE, then the bus will accordingly be in a busy state and the grant flip-flop 22 cannot be set.

If grant flip-flop 22 has been set, the Q output signal (MYDCNN+) is a binary ONE and will be inverted to a binary ZERO signal by inverter 23 and will then be placed on the bus on signal line BSDCNN−. This is shown in the timing diagram of FIG. 7 wherein the BSDCNN− signal goes from the binary ONE to the binary ZERO state. Thus, the priority cycle of the bus cycle is completed.

In addition, if the present device does require service and is the highest priority device, the output from delay 13 and the BSAUOK+ priority line will be a binary ONE, however, the $\overline{Q}$ output of flip-flop 17 will be a binary ZERO thereby placing a binary ZERO via AND gate 20 on the BSMYOK+ line thereby indicating to the next lower priority device and succeeding lower priority devices that there is a requesting higher priority device which will be using the next bus cycle, thereby inhibiting all lower priority devices from so using the next bus cycle. It should be noted that the nine priority lines received from the higher priority devices are transferred in a skewed manner by one position as signals BSBUOK+ through BSMYOK+. Thus, signal BSAUOK+ received by the present device corresponds to signal BSBUOK+ received at the next higher priority device.

Having completed a priority cycle and having now caused a binary ZERO state to be placed on the BSDCNN− line, the signal is received by all such logic as shown in FIG. 8 by receiver 24. This causes the binary ONE state to be generated at the output of receiver 24 and a binary ZERO to be provided at the output of NOR gate 26 thereby disabling AND gate 12 from generating a binary ONE state. In addition, the binary ONE state at the output of receiver 24 is received by delay line 25 which is by way of example 60 nanoseconds in duration. The output of delay line 25 is also received at the other input of NOR gate 26 so as to continue to inhibit gate 12 when the strobe is generated. Thus, at the end of the delay line period established by delay line 25, the strobe (BSDCND+) signal is generated, the inversion of which, i.e., the BSDCND− signal is shown in the timing diagram of FIG. 7. The use of the strobe signal is hereinafter described. Thus the 60 nanosecond period produced by delay line 25 enables the winning device, i.e., the highest priority requesting device, to utilize the next bus cycle without interference. The strobe generated at the output of delay line 25 is used by a potential slave as a synchronizing signal.

If the strobe signal has been transmitted, then the one of the units which is designated as the slave, will respond with either one of the signals ACK, WAIT or NAK received at one of the inputs of gate 21. If in the typical case, the ACK is received, for example, or if any of such response signals are received, this will reset the grant flip-flop 22 via gate 21. This response is shown in the timing diagram of FIG. 7 wherein the BSACKR− signal is shown to be received from the slave thereby causing the BSDCNN− signal to change to the binary ONE state by the resetting of grant flip-flop 22. Flip-flop 15 will be reset via NOR gate 29 if the grant flip-flop 22 has been set, or if the bus clear signal (BSMCLR+) is received on the bus. Flip-flop 17 will be reset if the master clear signal (MYMCLR−0 is received.

When the grant flip-flop 22 is set, its $\overline{Q}$ output (MYDCN−) goes to the binary ZERO state following which, when the grant flip-flop 22 is reset, the $\overline{Q}$ output goes from the binary ZERO to the binary ONE state thereby effectively resetting request flip-flop 17 as shall be presently explained. As may be noted from the aforementioned U.S. Pat. No. 4,030,295, the request flip-flop 17 was shown to be reset by either the ACK, NAK or master clear signal. With respect to the ACK or NAK signals, this assumes that the device whose request flip-flop 17 is to be reset, retained in local storage such as a flip-flop, the fact that it expected either a ACK, NAK or WAIT signal. Further, such units required logic which could discern that in fact such ACK or NAK signal was a response from a slave unit to this particular unit. Otherwise, a NAK or ACK signal would couple to reset all the flip-flops 17 thereby requiring that each of such request flip-flops 17 be set again. Accordingly, logic is minimized in the system by resetting the particular unit. This is accomplished by effectively coupling the $\overline{Q}$ output of the grant flip-flop 22 to the clock input of request flip-flop 17. It should be noted that the ACK or NAK as well as the WAIT signal are utilized to reset the grant flip-flop 22, but in so doing, does not require additional logic since, in fact, only one grant flip-flop 22 could have been set. Thus, the resetting of all grant flip-flops makes no difference in the operation of the system.

In order to enable clock input of flip-flop 17, the signal received at such clock input must be a transition from the binary ZERO to the binary ONE state. When the clock input is so enabled, the signal at the D input thereof, i.e., the BSWAIT+ signal will have its state transferred to the Q output of flip-flop 17. Accordingly, in order to effectively reset flip-flop 17, the BSWAIT+ signal must be a binary ZERO so as to cause $\overline{Q}$ output of flip-flop 17 to be a binary ZERO when the clock input thereof is enabled. Since the BSWAIT+ signal is normally a binary ZERO, premature enabling of the clock input request flip-flop 17 may erroneously reset such flip-flop. This is so because the response from a slave unit cannot be anticipated, it being noted that the slave unit may in the alternative provide either an ACK, NAK or WAIT signal, in which case of the WAIT signal, it is not desired to reset the request flip-flop 17. Thus the clock input should be enabled only when a response has been received from the slave unit. Otherwise, the WAIT signal may be in the binary ZERO state thereby prematurely resetting the request flip-flop 17.

It can be seen that under normal conditions therefore that a direct connection from the $\overline{Q}$ output to the clock input of flip-flip 17 would maintain a binary ONE state at such clock input, and that accordingly when grant flip-flop 22 is set and then reset, the change in state would enable such clock input of flip-flop 17. This condition, i.e. normally a binary ONE state at the clock input of flip-flop 17, has been found to delay the propagation of the setting action of such flip-flop wherein the Q output thereof actually realizes the set condition, i.e. the binary ONE state. More particularly, for example, using a flip-flop whose part number is SN74S74 which is manufactured by a number of companies including, for example, Texas Instruments Inc. and Signetics Corporation, with the clock input at a binary ONE state, it takes twice as long to realize the effect of the setting action than it does if the clock input is in the binary ZERO state. Accordingly, as can be seen by the connection of the clock input of flip-flop 22 to ground, this insures faster setting action for such grant flip-flop 22 and it is accordingly desirable to enable such increase in logic speed for the request flip-flop 17. Because of this, and the fact that the request flip-flop 17 should not be effectively reset until there is a response from the slave, elements 35 and 37 are coupled in the logic as shall be presently explained.

Before such explanation however, it should be noted that the provision of an inverter directly between the $\overline{Q}$ output of grant flip-flop 22 and the clock input of request flip-flop 17 would not be satisfactory even though this would provide a normally binary ZERO state at the clock input of request flip-flop 17. This condition would not be satisfactory because the binary ONE to binary ZERO transition from the $\overline{Q}$ output of flip-flop 22 when such flip-flop is set would become a binary ZERO to binary ONE transition which would enable the clock input of flip-flop 17 prematurely, that is, prior to knowing what the response from the slave unit will be.

Accordingly, inverter 35 is provided along with flip-flop 37. Like request flip-flop 17 the clock input of flip-flop 37 is not enabled until there is a transition from the binary ZERO to the binary ONE state or in other words a positive going transition. This is accordingly received, as explained hereinabove, when the grant flip-flop 22 is reset by means of NOR gate 21.

Flip-flop 37 in addition to the clock input includes a set input (S), a data (D) input, and a reset (R) input. The set input is effectively disabled by setting the input thereof to the binary ONE state by means of the MYPLUP+ signal which is no more than a signal received via a pullup resistor to a plus voltage. The D input of flip-flop 37 is also coupled to the MYPLUP+ signal. Normally the output of NOR gate 26 is a binary ONE and accordingly the output of inverter 35 (BSDCND+0 is a binary ZERO. These conditions are changed when the BSDCNN+ signal goes to the binary ZERO state just after time 7-C, i.e., time 7-C plus the delay period associated with elements 24 and 26. Thus shortly after time 7-C the output of NOR gate 26 will change to the binary ZERO state thereby presenting a binary ONE state at the R input of flip-flop 37. It is noted that a change in the binary ONE state to the binary ZERO state will reset flip-flop 37 thereby presenting a binary ZERO state at the Q output (MYREQR+) of flip-flop 37. A binary ONE state at the output of inverter 35 continues for so long as the BSDCNN— signal is a binary ZERO and for 60 nanoseconds thereafter consistent with the delay period of delay 25. Shortly after the grant flip-flop 22 is reset and before the BSDCNN— signal has an effect on the output of NOR gate 26, the clock input of flip-flop 37 is enabled so that a binary ONE state at the D input thereof causes the Q output of flip-flop 37 to change from the binary ZERO to the binary ONE state thereby clocking flip-flop 17. At the time when the strobe signal, i.e., the BSDCND+ signal is no longer present, as can be seen with respect to the BSDCND— signal as shown in the timing diagram FIG. 7, and more particularly at time 7-G, the output of NOR gate 26 changes back to the binary ONE state thereby causing the output of inverter 35 to change from the binary ONE state to the binary ZERO state thereby resetting flip-flop 37. This ensures that the flip-flop 37 will be reset prior to the enabling of the clock input of flip-flop 37. The binary ZERO state thereafter continues to be present at the Q output signal MYREQR+ of flip-flop 37 until the above operation is again commenced.

As discussed hereinbefore, the coupling between the Q output of request flip-flop 17 and NAND gate 19 is dependent upon the position of the unit on the bus 200. More particularly, the element 28 in such coupling between flip-flop 17 and NAND gate 19 is a direct connection for all units which are not the highest priority unit. For the unit which is the highest priority unit and, more particularly, by the illustration of FIG. 1, memory 202, element 28 is a delay element similar to delay 13 and, by way of illustration, may include a delay of 20 nanoseconds. The reason for this is that in the highest priority unit the top nine inputs of its NAND gate 19 are a binary ONE signal. This binary ONE signal may be provided for each such one of the nine lines by means of a pullup resistor coupled thereto, the other end of which is coupled to a plus voltage source similar to the manner in which the MYPLUP+ signal is so coupled. With each of the nine inputs to NAND gate 19 being a binary ONE, and with the BSDCNB— signal being normally a binary ONE and further assuming that the user ready signal (MCDCNP+ in FIG. 8) is in a binary ONE state, then without a delay element 28 in the priority logic of the highest priority unit, such highest priority unit would always win access to the bus without incurring the delay provided by delay 13. Thus, by providing a delay in element 28, this prevents the highest priority device from setting its grant flip-flop for the period of, for example, 20 nanosecnds after the time it sets it request flip-flop 17. In the highest priority unit, and in parallel with the delay element 28, a direct connection may also be provided with the other inputs to gate 19 so as to avoid the enabling of gate 19 due to a momentary pulse generated at the Q output of flip-flop 17 because of, for example, a race condition in the logic of FIG. 8.

Thus, in this manner, the highest priority unit is also prevented from gaining access to the bus 200 during a bus cycle of another unit. This is so because signal BSDCNB— will be binary ZERO if, in fact, another bus cycle is in process. It can be seen that this inhibiting of the priority logic of the highest priority unit may be accomplished in other ways. For example, as explained in the aforementioned United States Patent, the output of delay 13 may be coupled to another input of NAND gate 19 in which case, for each priority logic of each unit, this would replace the need for BSDCNB— signal at one input of gate 19 and the need for a delay element 28 in the priority logic of the highest priority unit. However, in logic which requires the extreme speed as indicated herein, loading effects depending upon the component picked may present a problem. Accordingly, by the technique as explained herein, the delay 13 includes two element loads as opposed to three element loads. It can be further seen that such loading problem might be prevented by placing a driver or amplifying element at the output of delay 13, the output of which driver would be coupled to NAND gate 19, NOR gate 14 and AND gate 20, without presenting a loading problem. However, this has the effect of slowing down the operation of the priority logic by a factor determined by a propagation delay through such driver element.

MEMORY CONTROLLER BUS INTERFACE LOGIC

Figure 10:
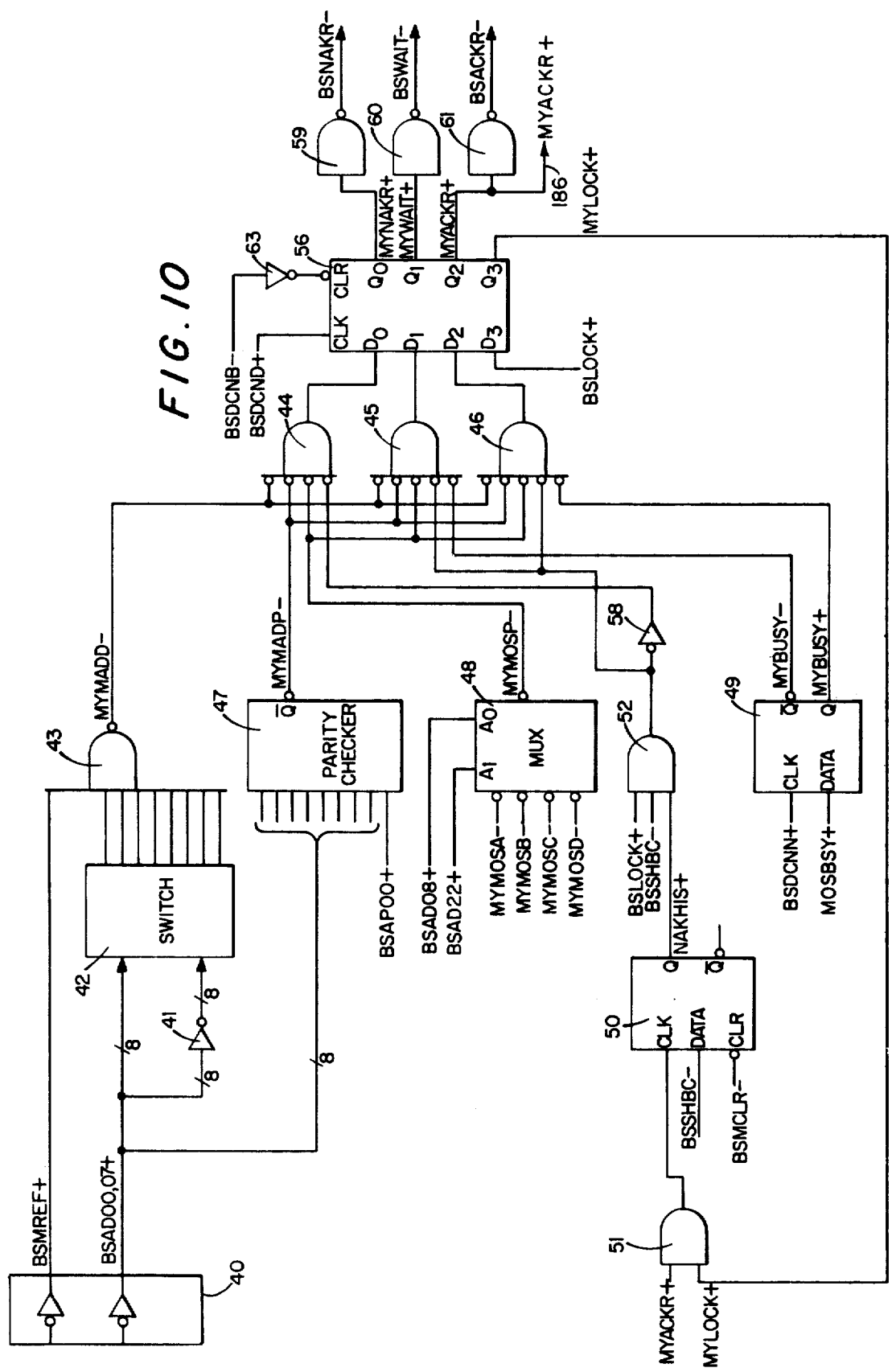
FIG. 10 illustrates bus interface logic of a typical memory controller coupled with the bus of the present invention.

Now with reference to double fetch memory controller address logic as shown in FIG. 10, this logic is exemplary of memory controllers, particularly one having up to four memory modules coupled thereto. The address received by element 40 from the bus is transferred by the bus address signals BSAD00+ through BSAD07+ in the format shown as in FIG. 2. The address signals from receiver 40 are also received as the inputs of parity check 47 to be hereinafter described. The address signals from receiver 40 and also those at the output of inverters 41 are received by a switch 42. This switch is located in most controllers connected to bus 200 and is set to the address of the particular controller unit. In the case of a device controller, this switch is set to the value to be used to address the device. In the case of a memory controller, this switch is set to the address of the memory controlled by the particular memory controller. With sixteen leads received at the switch, only eight are coupled at the output thereof to multiple input NAND gate 43. The bus address leads at the input side of element 40 are a binary ZERO for those bits set to reflect the proper address of the desired memory block controlled by the memory controller. Accordingly, with the invention provided by element 40, binary ONE signals are provided at non-inverted inputs of switch 42 for those bits of the address which are received on bus 200 as binary ZEROS. Similarly, the eight output leads from the inverters 41 have binary ONEs for those positions in which the address bits are binary ONEs in the incoming address bits on bus 200. With the signals at the two inputs of switch 42 the complements of each other, the switches therein, which may be a hexadecimal switch or a plurality of toggle switches, more particularly a non-ganged eight pole, two position switch, are set so that for the correct memory address, all binary ONEs signals appear at the eight outputs of switch 42. Thus, gate 43 will receive all binary ONE signals and will provide a binary ZERO at its output if this is the proper memory address and if it is a memory cycle as shall be explained. It can be seen that the switch 42 is arranged so as to provide a comparator funtion and eliminates the need for at least one level of gating and accordingly the associated propagation delay therefore. Further, the switch provides an easy means for changing the address of a particular memory controller thereby simplifying the manner in which a system may be configured. If the memory reference signal (BSMREF+) is a binary ONE, and the address compared by switch 42 generates all binary ONES at the output of switch 42, then NAND gate 43 will be fully enabled to provide a binary ZERO signal on the MYMADD— line which is received at one input of each of the three NOR gates 44, 45 and 46 which are utilized to generate the NAK, WAIT and ACK signals respectively. The memory cannot be addressed unless in fact the BSMREF+ signal is in the correct binary state.

As indicated, the address bits are received at the inputs of parity checker 47 which in addition receives the BSAP00+ bit which is the address parity received over the bus. Parity checker 47 makes a nine bit parity check and generates at its $\overline{Q}$ output, a signal labelled MYMADP—, which when a binary ZERO partially enables the gates 44, 45 and 46, thereby indicating that the parity is correct.

A third input to the gates 44, 45 and 46 is received from the multiplexer 48. Multiplexer 48 receives, by way of example, four inputs labeled MYMOSA— through MYMOSD— which indicate whether or not any one or all four of the memory modules connectable to this particular controller are actually present in the system. This allows a memory to either have a full memory module array or have a partial array, that is, only one of such memory modules may be connected in the system. As will be seen hereinafter, for a memory controller to respond with two words in response to a double fetch request, either two or four memory modules must be present within the controller. If only the memory module containing the first word is present in the controller, the controller will respond with that word and indicate that a second word will not follow. If the memory module containing the first word is not present in the controller, the controller will not respond at all. These four memory modules are further addressed and via multiplexer 48 are tested to determine if they are installed by means of the two bus address signals BSADO8+ and BSAD22+. Multiplexer 48 may be that device manufactured by Texas Instruments having Part No. 74S151. The binary ZERO state of the multiplexer output signal indicates that the memory module is present in the memory controller.

Thus for differently configured systems there may be one memory module connected to one particular memory controller and there may be two such modules connected to another such controller and in fact the different memory modules connected to the different controllers may be of different types. For example, in this manner a semiconductor memory may be connected to one controller whereas a magnetic core memory may be connected to another. Further, different size, i.e., more or less storage capacity, memory modules may be used. Further, by arranging the memory modules in different controllers, then different speed memories may be used thereby increasing the speed of the system response. Also, for any given controller there is normally only a given power support and timing capability and in the normal case, that controller establishes the personality of the memories that may connect to it. Accordingly, for example, if there are different types of memory speeds or different types of timing required such as for example between core and semiconductor memory, then a different controller must be utilized for each type. Further, by use of different controllers, the memories can be run faster since in fact they can be run essentially parallel in time with each other even though they are connected to the same bus, however, only one transfer can take place at a time on a bus, the point being that the information will be ready in the memory without any access time required since in fact the access time has already taken place.

Figure 14:
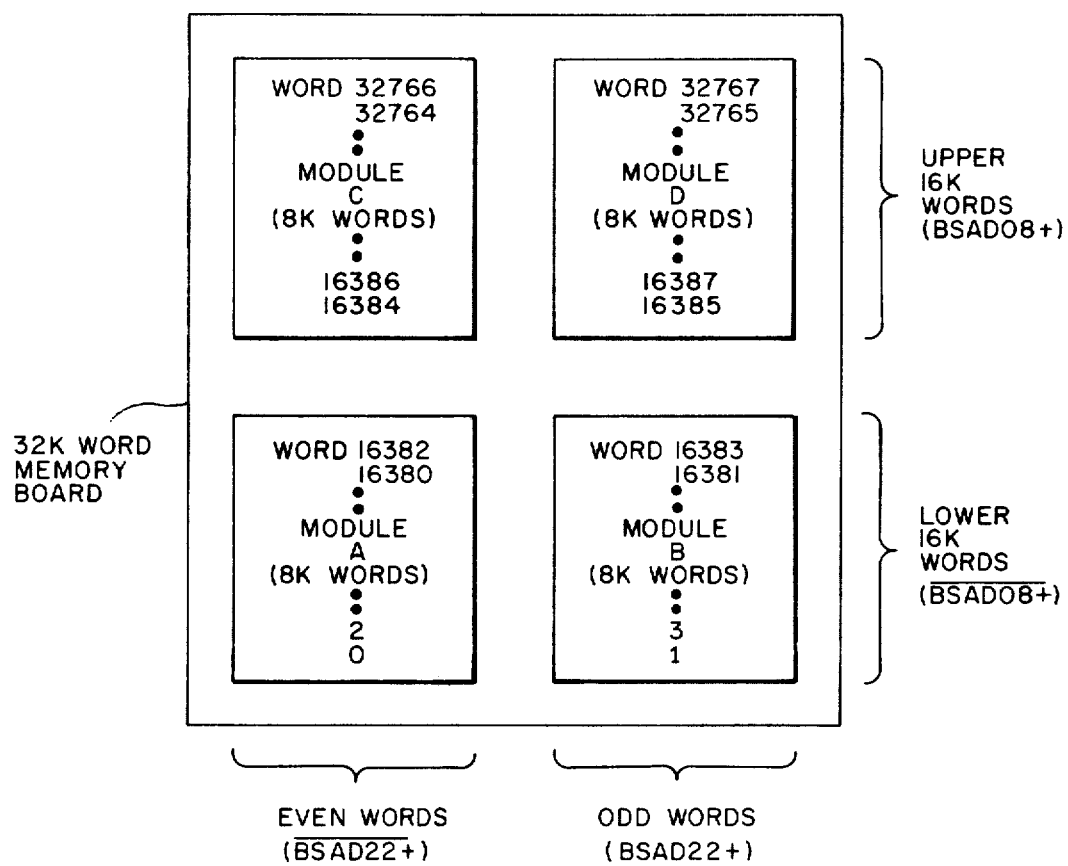
FIG. 14 illustrates a memory board and memory modules of the present invention.

As indicated hereinbefore, each controller whether it be for memory or another peripheral device generally has its own specific address. Thus, for different memory controllers having a full complement of memory modules connected thereto, contiguous memory address may be provided. More specifically, assuming that each memory controller has four memory modules coupled thereto, and that each such modules has the capability of about 8,000 words of storage, then each such memory controller will be able to provide access to 32,000 words of storage. Further, in the case of a double fetch memory, assume that each 8,000 (8k) word memory module contains even address words or 8,000 odd address words as illustrated in FIG. 14. That is, module A and module B contain the lower 16,000 (16k) words and modules C and D contain the upper 16,000 words with even addressed words contained in modules A and C and the odd addressed words contained in modules B and D. With a full 32,000 words of storage coupled in the system for each memory controller, the addresses of the memories are contiguous. From an operations point of view, contiguous memory address is important not only for purposes of system addressing, but also for increased response in the system. As mentioned before, typically the memory controller can only provide service for a memory of a certin characteristic, i.e., a magnetic core memory cannot be coupled to the same memory controller as a semiconductor memory because of the basic timing differences associated therewith. The same is normally true for memories of different speeds or power requirements. Thus, assuming again that each memory controller may provide service for 32,000 words of memory, if only 16,000 words are to be used for high speed memory, this means that two memory controllers must be used. However, this would typically mean that the memory addresses between the high speed and the low speed memory would not be contiguous because the memory controller addresses are 32,000 words apart. In this case, it is possible to provide contiguous memory addresses by allowing both of the memory controllers to have the same address. However, this would also mean that the respective memory module positions of the two controllers could not be both occupied in the same location in each such controller. More specifically, the first controller would utilize two 8,000 word storage locations in memory module postions A and B, FIG. 14, as indicated by the MYMOSA— and MYMOSB— signals. The other controller would utilize the other two memory module positions C and D, the presence of which would be indicated by the MYMOSC— and MYMOSD— signals. Thus, these two controllers appear in the system as if they were one controller. By way of further example, one such controller may have simply 8,000 words of one such memory coupled therein in the form of one module, for example, a module A containing the even addressed lower 16k words, whereas the other memory module with the same address may have coupled therewith up to three such memory modules in the other three positions, modules B, C and D containing the odd addressed lower 16k words and the even and odd addressed upper 16k words, to accordingly provide 24,000 words of memory storage. Multiplexer 48 in conjunction with switch 42 and NAND gate 43 function to determine if the memory module containing the word addressed by the memory address (i.e., the first word) in the double fetch request is present in the memory controller. Thus, signal BSAD08+ determines whether the memory address provided in the memory fetch request is in the upper or lower 16k words, i.e., in modules C and D or in modules A and B. Since signal BSAD23+ is used to address the right or left byte within a word it is signal BSAD22+ which determines whether the word addressed in the memory address of the double fetch request is an even addressed word or an odd addressed word, i.e., in modules A and C or modules B and D. Since only the memory address of the first word of the two words to be fetched in a double fetch request is presented on the bus, it can be seen that multiplexer 48 provides a signal which indicates whether the module containing the first word of the two words to be fetched is present. As will be seen hereinafter, other multiplexers determine whether the second word of the two words to be fetched in response to a double fetch request is also present within the same memory controller as is the first word to be fetched.

This ability to arrange memory modules between one or more controllers need not necessarily be limited to different types of memories, but in fact may address the problem of defective memory modules coupled to a controller. For example, a redundant memory module may be provided, coupled with another controller whose device address may be set and the failed memory controller's device address reset as appropriate upon detection of a failure.

Referring again to the enabling of gates 44, 45 and 46, each of such gates in order to be enabled and allow a response from this particular memory controller, must receive its memory controller's address, an indication that the module addressed exists in the system, and that the address parity is correct, as indicated by parity checker 47. The other inputs to the NOR gates are provided from a combination of busy logic and lock history logic as presently described.

The memory controller busy signal is provided by flip-flop 49 and indicates that the controller is busy reading or writing data, refreshing memory or waiting for the bus. This D type flip-flop 49 is clocked by the BSDCNN+ signal. If a memory module is busy then a WAIT signal will be generated. Thus, if the MYBUSY— signal at the $\overline{Q}$ output of flip-flop 49 is a binary ZERO, this enables, if the other conditions are met, gate 45 to be fully enabled and to set the associated flip-flop in element 56, it being noted that this is done when the BSDCND+ signal is received at the clock input of element 56. At this point, it is noted that this flip-flop element 56 is cleared via inverter 63 when BSDCNB— transitions from the binary ZERO to a binary ONE state at the output of gate 26M shown in FIG. 9. The acknowledge signal will be generated when a binary ZERO is generated at the Q output of flip-flop 49 as indicated by the MYBUSY+ signal coupled to one output of gate 46. It is again noted that the WAIT signal means that there will be very short delay since the memory is still busy.

The other condition which indicates which of the ACK, NAK or WAIT signals is to be generated, is the lock signal which as indicated hereinbefore comprises a multi cycle bus transfer whereby a device can access a specific memory location without any other locked unit being able to break into the operation. The effect of this locked operation is to extend the busy condition of the memory controller beyond the completion of a single cycle for certain kinds of operations. Devices attempting to initiate a lock operation before the last cycle of the sequence is complete will receive a NAK signal. The memory will however still respond to a memory request as shall be presently explained. It is noted that the intervening time between these cycles may be used by other units not involved in the transfer. A locked operation is used primarily where it is desirable for two or more units or devices to share the same resource, such as memory for example. The locked operation, which can include any number of bus cycles, is unlocked by the particular unit or device which has had control of the shared resource. While the shared resource is locked, other units desiring to access the shared resource will be locked out if such other units present the lock control signal. If the lock control signal is not presented, it is possible for such other unit to gain access to the shared resource such as for example to process an urgent request or procedure. Before any unit presenting the lock control signal gains access to the shared resource, it tests the resource to see whether it is involved in a locked operation and then during the same bus cycle, if the resource is not involved in a locked operation, it may gain access to the resource.

Thus, it can be seen that the locked operation for sharing a resource is one that is effective between those units which issue the appropriate controls, i.e., the lock control signal, and may be used for example in sharing a portion of memory in which a table of information may be stored. Further, if one of the units desires to change information in the shared resource, other units may be locked out so that they do not gain access to only partially changed information, but rather are allowed access only after all such changes have been made. A read modify write operation may be involved in such case. By use of the locked operation, it can be seen that a multiprocessing system may be supported. For example, with two central processing units connected to the same bus 200, both may share the memory units connected to the bus without interference if the locked operation is used.

It is noted that the BSSHBC− signal for the locked operation, as shall be seen, is used in a somewhat different manner than has been heretofore discussed. During the locked operation, the BSSHBC− signal is issued by the unit attempting to share a resource both to gain access to the shared resource by means of a test and lock procedure and to unlock the share resource when it has completed its locked operation.

Thus, as can be seen by FIG. 10, a lock history flip-flop 50 is provided, which is set indicates that a locked operation is in process, thereby enabling a NAK signal to be issued to a requesting unit via driver 59. Assuming that the logic of FIG. 10 represents the bus 200 interface logic for the shared resource, the BSLOCK+ signal (binary ONE state) is received by both AND gate 52 and flip-flop D3 of element 56. Element 56 thereby generates the MYLOCK+ signal which is received at one input of AND gate 51. If the lock history flip-flop is not set, the NAKHIS+ signal will be a binary ZERO thereby, independent of the state of the other two inputs to gate 52, generating a binary ZERO at one input to gate 46. If all inputs of gate 46 receive a binary ZERO, thereby indicating that the current address for this unit and device were received, and that the common element or buffer is not busy, then an ACK signal will be generated via element 56 and driver 61 in response to the BSLOCK+ signal. The ACK signal (MYACKR+) will fully enable AND gate 51 to set the history flip-flop 50 in response to the binary ONE state of the BSSHBC− signal at the D input thereof which is received with the binary ONE state of the BSLOCK+ signal at the commencement of the locked operation. Thus, a test and lock operation is performed during the same bus cycle.

If flip-flop 50 had already been set at the time of the receipt of the binary ONE state of the BSLOCK+ and BSSHBC− signals, then a binary ONE signal will be generated at the output of AND gate 52 thereby generating a binary ZERO state at the output of inverter 58 so as to enable AND gate 44, all other conditions having been met, to generate the NAK signal. Thus, the test and lock operation would have produced a NAK response inhibiting another unit from using the shared resource.

Once the unit using the shared resource is through with its operation, it must unlock the resource. This is done by receipt from he user unit of the binary ONE state of the BSLOCK+ signal and the binary ZERO state of the BSSHBC− signal. This enables the logic of FIG. 10 to provide an ACK response, enabling gate 51 and thereby effectively resetting history flip-flop 50 because of the binary ZERO state of the BSSHBC− signal. The shared resource is now free to make an ACK response to other units. The shared resource may also be unlocked by a bus clear signal (binary ZERO state of BSMCLR−) at the clear input of lock history flip-flop 50.

It can be seen that the shared resource will only lock out other units which present the binary ONE state of the BSLOCK+ signal. If a unit, for example, desires to gain access to a shared resource which had its history flip-flop set so that NAKHIS+ signal is a binary ONE, then, if the BSLOCK+ signal is a binary ZERO, the output of AND gate 52 will be a binary ZERO, thereby disabling a NAK response and enabling, dependent upon other conditions, either a WAIT or ACK response. Thus, a unit may gain access to a shared resource even though the resource is involved in a locked operation.

Thus, it can be seen that the generation of a WAIT signal from any one of the controllers allows a device or controller of higher priority to break into the sequence of the bus cycles and use the bus as necessary. If there is not a higher priority unit which is requesting service, the particular master/slave arrangement will be maintained until the acknowledge is received by the master thereby ending the WAIT condition. Following this, another user is allowed to use the bus. Thus, the BSDCNN+ signal allows a slave to generate any one of three responses, either the NAK, WAIT or ACK signals. At the end of any one of these responses, a new priority net cycle occurs and this particular device gains access to the bus or another higher priority device wins the bus. It should be understood at this point that signal states on the bus are the inverse in binary state to those signals shown internal to the units. For example, the bus request signal is referred to on the bus, between for example driver 18 and receiver 11 in FIG. 8 to be in one state and in the opposite state in the controllers themselves. Further, as indicated hereinbefore, a fourth response between any of the controllers connected on the bus is that there is no response at all. Thus, if one of the masters is calling for service from the memory and this memory is not installed in the system, a time out element, well known in the art, will generate a signal after a certain period of time, such as for example 5 microseconds, thereby generating a NAK signal. At the point, a central processor may take action such as by an interrupt or trap routine.

As indicated hereinbefore, when information is being transferred from the memory, the memory can never receive a NAK or WAIT signal. This is because of the inherent priority arrangement of the apparatus of the present invention. The memory is the highest priority device. If a unit has asked memory to send it information, then the unit can expect the information at some point in time. If the unit generates a WAIT or NAK signal to the memory, then because the memory is the highest priority device, the memory could keep trying to gain access to the particular controller which requested the data transfer and could hang up the bus, i.e., it could because the memory is the highest priority device, cause the bus to effectively disable further data transfers until the data is accepted by the particular controller which had previously asked for it. In actual practice, as can be seen in the memory controller logic in FIG. 9, a WAIT or NAK response to the memory will result in the memory grant flip-flop 22M being reset by a BSWAIT+ or BSNAKR+ signal appearing at the input of NOR gate 21M. This results in the resetting of user flip-flop 15M, via double word associated logic 94 and NOR gate 29M, which will result in the resetting of request flip-flop 17M. The effect of these flip-flop resettings is that a WAIT or NAK response to memory will result in the memory not trying again to transfer the data to the requesting unit and the data will therefore in effect be lost. Thus, only an acknowledge signal can be made in response to a request from memory to accept data. A controller however is allowed to generate a NAK or WAIT signal to another controller or control processor without loss of data. In addition, a general rule is that if one controller requests information from a controller of higher priority, the requesting controller must be ready to accept the information, and accordingly must respond with an ACK signal.

If the device is not ready, then the NAK signal, other conditions being met, will be generated. The reason the NAK signal is generated rather than the WAIT signal is because of the fact that typically, if a controller such as controller 210, is busy, the terminal will be busy more than just a few microseconds but rather will be busy for milliseconds. Thus, cycle time would be wasted if the indication to the master is that the master keep trying. Rather, the indication should be that the requesting unit go on with data processing rather than unnecessarily using bus cycles thereby delaying the overall response of the system. All the requesting unit has to do is at its convenience retry the destination unit.

Referring again to the operation of the memory busy flip-flop 49 of FIG. 10, the data input is coupled to receive the MOSBSY+ signal which is asynchronous to the bus operation. This signal may be received at any time regardless of the operation which is occurring on the bus for any controller. When the BSDCNN+ signal is received from the master at the clock input of flip-flop 49, a history is stored as to the state of the memory, i.e., whether it is busy or not at that time. Thus, this eliminates confusion in the response to the bus cycle. Without the history retention provided by flip-flop 49, it would be possible to start out the bus cycle in a WAIT condition and end up the same bus cycle in the state which generates an ACK condition. Thus, both responses would be made during the same bus cycle which would thus be an error condition. By use of the history flip-flop 49, the response is fixed as to the condition which the controller was in at the time the BSDCNN+ signal is received thereby allowing an asynchronous response and regardless of the tolerance or difference in memory speed.

DOUBLE FETCH OPERATION RESPONSE CYCLES

The above description completes the discussion of the first bus cycle of a double fetch operation in which the central processor as master makes a double fetch request of the memory and the memory controller responds with either an acceptance or a rejection of the request. The second and third bus cycles will now be discussed in which the memory controller is the master and the central processor is the slave. In these two bus cycles, the memory controller bids for the bus and puts the requested information on the bus for the central processor to accept. These two bus cycles will now be described in detail by referring to FIGS. 9, 9A 11 and 11A.

MEMORY CONTROLLER PRIORITY NETWORK LOGIC

FIG. 9 shows the logic each memory requires to request a bus cycle, perform tie-breaking and generate a data cycle now (BSDCNN−) signal. All other units on the bus have similar logic for the hand-shaking function, e.g., the central processor has a priority network logic shown in FIG. 8. Also shown in FIG. 9 is logic which alters memory's hand-shaking function during a double fetch operation. This double word associated logic, element 94, is shown in greater detail in FIG. 9A. Because of the similarity of logic elements and functions between the priority network logic of FIG. 8 and FIG. 9 only the differences will hereinafter be disussed. That is, in FIG. 9, elements 10M, 11M, 13M, 14M, 16M, 18M, 20M, 21M, 22M, 23M, 24M, 25M and 26M are identical to and function the same as the corresponding elememnts 10 through 26 of FIG. 8. Elements 12M, 15M, 17M, 19M, 28M and 29M of FIG. 9 are similar to elements 12 through 29 respectively of FIG. 8 and only the differences will be hereinafter discussed.

Bus requests are made by memory only when the memory is ready to transmit previously requested data (i.e., during the initiation of a response second-half bus cycle). Again referring to FIG. 9, when memory accepts a request and is not performing a MOS memory refresh cycle, the memory timing generator 95 of FIG. 9A generates a clock function signal DCNNGO− which is connected to the clock (C) input of user flip-flop 15M via line 185. When signal DCNNGO− transitions from a binary ZERO to the binary ONE state, the INREDY− signal from NOR gate 87 of FIG. 9A which is connected to the D input of user flip-flop 15M via line 184 is transferred to the Q output of user flip-flop 15M.

Since signal INREDY− is a binary ONE, as will be seen hereinafter in discussing FIG. 9A, the Q output signal, stored request signal STREQQ+, of user flip-flop 15M will be a binary ONE. The set (S) input of user flip-flop 15M is effectively disabled by setting the input thereof to a binary ONE state by means of the MYPLUP+ signal which is no more than a signal received via a pullup resistor to a plus voltage. If there is no other bus cycle request pending (signal BSREQT− is a binary ONE), no data cycles are in progress signal (signal BSDCNN− is a binary ONE), and the system is not clearing all logic from initialization (signal BSMCLR− is a binary ONE), then the output of NOR gate 14M, signal BSBSY−, is a binary ONE. Bus clear signal BSMCLR− is an input to AND gate 12M of FIG. 9 replacing master clear signal MYMCLR−, an input to AND gate 12 of FIG. 8. Therefore, the stored request signal STREQQ+ going to the binary ONE state makes both inputs to NAND gate 16M a binary ONE resulting in the output of NAND 16M being a binary ZERO. The occurence of a binary ZERO at the set input of request flip-flop 17M results in request flip-flop 17M being set. With the clock input of flip-flop 17M grounded, a binary ZERO, flip-flop 17M is set only by the output of NAND gate 16M. The setting of the Q output of request flip-flop 17M to the binary ONE state results in a request being made to the bus tie-breaking network, NAND gate 19M, to compare the priority of this bus request to other possible simultaneous requests (if any). At the same time, the Q output of request flip-flop 17M is sent to the bus transceivers where it is inverted by element 18M to become the bus request signal (BSREQT−) on the bus.

When signal BSREQT− becomes a binary ZERO, it prevents any other stored request from setting other request flip-flops 17M in the system. Since any unit can request a bus cycle by setting its user flip-flop 15M, more than one request flip-flop 17M can be set at any given time, each representing a possible future bus cycle. When there are simultaneous requests, NAND gate 19M grants a data cycle to the highest priority requesting unit by setting the approprite grant flip-flop 22M.

To grant a data cycle to any unit, NAND gate 19M must have all of its input tie-breaking signals a binary ONE. As discussed hereinbefore in connection with FIG. 8, element 28M in the highest priority unit, the memory, is a delay element similar to delay element 13M, which by way of illustration may include a delay of 20 nanoseconds. Without providing a delay in element 28M in the highest priority unit, such highest priority unit would always win access to the bus without incurring the delay provided by delay 13M. Thus, by providing a delay in element 28M, this prevents the highest priority device, the memory, from setting its grant flip-flop 22M for the delay period, for example, 20 nanoseconds after the time it sets it request flip-flop 17M. In the highest priority unit and in parallel with delay element 28M, a direct connection may also be provided from the Q output of request flip-flop 17M to an input of NAND gate 19M so as to avoid the enabling of gate 19M due to a momentary pulse generated at the Q output of flip-flop 17M because of, for example, a race condition in the logic of FIG. 9. Since memory does not pre-request the bus by setting its request flip-flop 17M in anticipation that it will be ready by the time the bus cycle is granted, there is no user ready signal as input to NAND gate 19M that corresponds to signal MCDCNP+ as discussed hereinbefore for the central processor priority network logic of FIG. 8. The other inputs to NAND gate 19M operate in a manner similar to those of NAND gate 19 of FIG. 8. Each unit drives the output of its AND gate 20M to a binary ZERO when making a bus request. Thus BSMYOK+ is set to a binary ZERO and sent to the bus where it becomes a disabling signal for the tie-breaking gates, NAND gates 19M on lower priority units.

Memory always occupies the highest priority position on the bus. In this position, the tie-breaking signals are tied to binary ONE signals from pullup resistors. Unless there is a higher priority memory controller in the system, when memory generates the signal MYREQT+ there is no binary ZERO tie-breaking signal at the input of NAND gate 19M, which would prevent the output of NAND gate 19M from becoming a binary ZERO and thus setting grant flip-flop 22M. With the clock input of flip-flop 22M grounded, a binary ZERO, flip-flop 22M is set only by the output of NAND gate 19M.

The setting of grant flip-flop results in signal MYDCNN+ at the Q output of grant flip-flop 22M becoming a binary ONE which is inverted through bus transceiver 23M and sent out on the bus as signal BSDCNN−. Signal MYDCNN+ on line 182 also resets user flip-flop 15M (via double word associated with logic 94, signal STREQR+ on line 183 and NOR gate 29M) unless there is a double fetch transfer as seen hereinafter. Signal MYDCNN+ also gates memory data, memory identification codes and some other control signals onto the bus.

During a double fetch operation, a requesting unit informs memory that a double word is requested by setting the double fetch signal BSDBPL− to a binary ZERO on the bus. A timing generator and a portion of the bus control logic enables double fetch memories to respond with two words rather than one as described hereinafter.

Figure 9A:
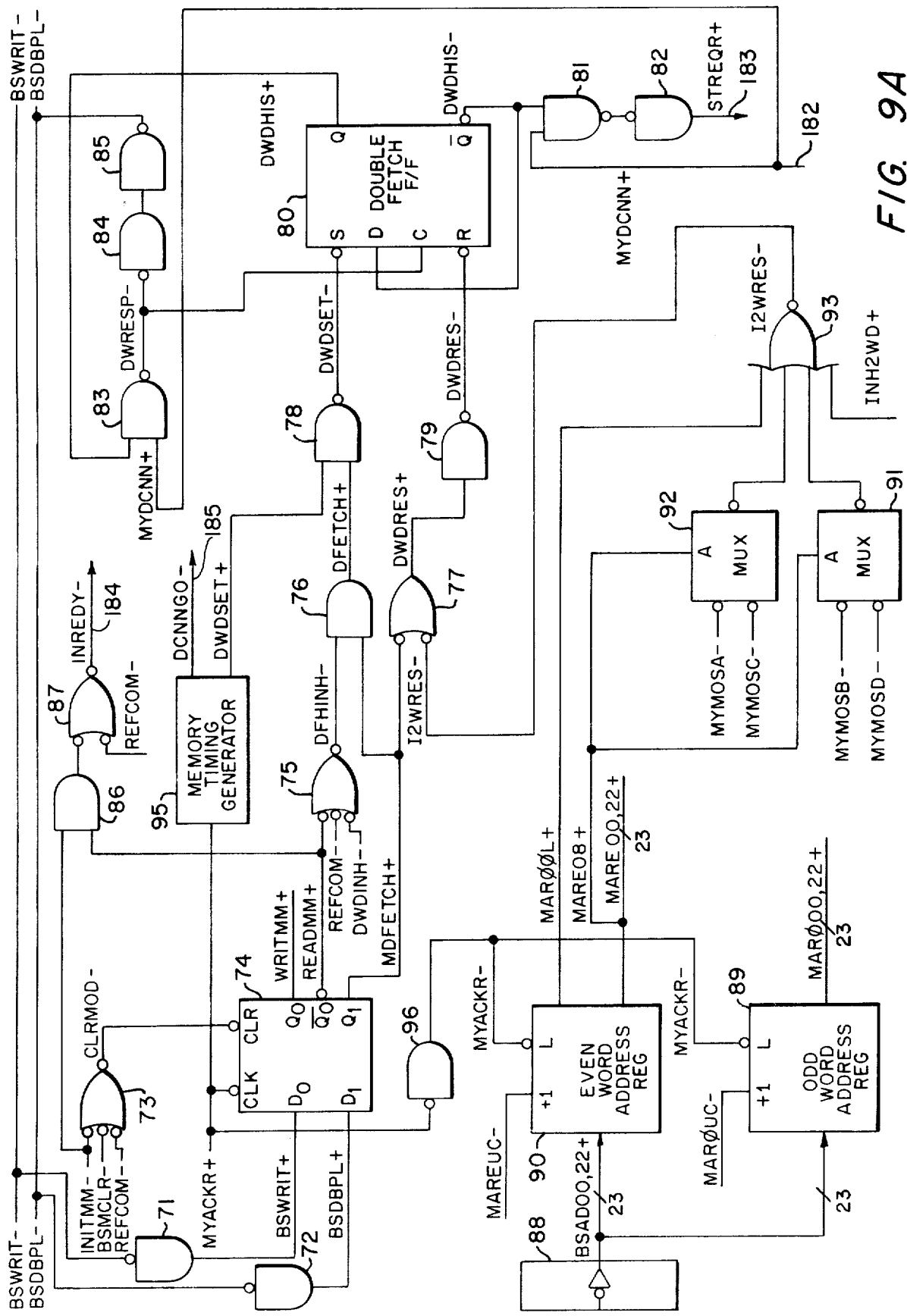

Bus control and response logic used for double fetch transfers are shown in FIGS. 9 and 9A. Now referring to FIG. 9 during single fetch transfers, signal MYDCNN+ is generated by grant flip-flop 22M when memory has been granted a bus cycle, sending back the requested data word. The memory user flip-flop 15M is reset on the leading edge of signal STREQR+ via NOR gate 29M. Signal STREQR+ on line 183 is generated by the double word associated logic 94 in response to signal MYDCNN+ on line 182 as will be seen hereinafter. The resetting of user flip-flop 15M causes the $\overline{Q}$ output thereof, signal STREQQ− to become a binary ONE and via NOR gate 70 to reset the memory's request flip-flop 17M. The resetting of request flip-flop 17M causes the $\overline{Q}$ output thereof, signal MYREQT− to become a binary ONE and via AND gate 20M causes signal BSMYOK+ to become a binary ONE thereby freeing the bus for the next operation. Thus it can be seen that in the case of a single fetch operation, the signal MYDCNN+ resets user flip-flop 15M after the first response cycle has occurred, whereas as seen hereinafter in a double fetch operation two response cycles are required before user flip-flop 15M is reset.

FIG. 9 also illustrates the logic used by the memory controller to remember the contents of the bus data leads during a memory request. Bus data lead signals BSDT00− through BSDT15− are received and inverted by 16 receivers 97 of FIG. 9. The resulting signals, BSDT00+ through BSDT15+, are clocked into register 98 by signal MYACKR+ on line 186 from the logic of FIG. 10 when the memory controller, as slave, acknowledges the memory request. Register 98 consists of 16 D type flip-flops and is used to remember the contents of the bus data leads. During a write request to memory, the bus data lines contain the 16 bit word of data which is to be written into memory. During a memory read request, the bus data lines contain the channel number of the requestor and the function code in the format shown in FIG. 4. During the response cycles of a read request, single fetch or double fetch read request, the channel number and function code are echoed back to the requesting unit on the bus address lines in the format shown in FIG. 3. The echoing back of the channel number and function code is done by signal MYDCNN− enabling the 16 drivers 99 to gate the contents of register 98 onto the bus address lines when the memory controller as master, has been granted the bus. As will be seen hereinafter, the echoing of the function code during the response cycles allows the central processor to distinquish between memory response cycles that are in response to single fetch requests of data and memory response cycles that are in response to double fetch requests of procedure.

Now referring to FIG. 9A, when memory accepts a double word read request, the output of AND gate 76, the double word fetch signal (DFETCH+) becomes a binary ONE, providing memory is not in a MOS memory refresh cycle. The DFETCH+ signal enables memory to generate two successive MYDCNN+ signals, which send out two data words requested by the master as described hereinafter. When the master makes a double fetch request, the BSWRIT− signal on the bus is a binary ONE indicating a read request, and therefore the output of receiver (inverting amplifier) 71 will be a binary ZERO. Also, during a double fetch request, since the double fetch signal BSDBPL− on the bus is a binary ZERO, the output of receiver 72 will be a binary ONE. If the memory containing the first of the two words to be fetched, i.e., the word addressed by the bus address lines BSAD00− through BSAD22−, is present in the particular memory and the memory is not busy, the memory controller logic of FIG. 10 will cause the MYACKR+ signal to transition from the binary ZERO to the binary ONE state which will clock the D inputs to the Q outputs of element 74. That is, the binary ZERO signal BSWRIT+ at input D0 will be clocked to the Q0 output making write memory signal WRITMM+ a binary ZERO and the $\overline{Q0}$ output read memory signal READMM+ a binary ONE. The binary ONE BSDBPL+ signal at the D1 input of element 74 will be clocked to the Q1 output thereof making signal MDFETCH+ a binary ONE. With no memory refresh in progress, signal REFCOM− is a binary ONE, with no double word inhibit in progress because the memory is not being tested, signal DWDINH− is a binary ONE, and with the setting of signal READMM+ to a binary ONE, the output of NOR gate 75, signal DFHINH−, becomes a binary ONE. With both inputs to AND gate 76 being a binary ONE, the output thereof, signal DFETCH+, becomes a binary ONE.

The coincidence of the DFETCH+ signal and signal DWDSET+, generated by memory timing generator 95 by delaying, by way of illustration 100 nanoseconds, signal MYACKR+, at the inputs to NAND gate 78 causes the output thereof, signal DWDSET−, to become a binary ZERO thereby setting double fetch history flip-flop 80. The purpose of double fetch history flip-flop 80 is to remember that the memory is responding to a double fetch operation so that when the memory gains control of the bus and responds during the first of two response cycles it will set the double fetch signal BSDBPL− to a binary ZERO to inform the requestor that this is the first of two words. The signal DWDHIS−, being a binary ZERO at the $\overline{Q}$ output of double fetch history flip-flop 80, prevents the output of NAND gate 81 from becoming a binary ZERO when memory responds with the MYDCNN+ signal, on line 182 being a binary ONE, during the first response cycle. This inhibiting by signal DWDHIS− prevents the output of inverter 82 from becoming a binary ONE in response to signal MYDCNN+ being a binary ONE, thereby inhibiting the resetting of memory user flip-flop 15M via NOR gate 29M of FIG. 9. This inhibiting of memory user flip-flop 15M by the double fetch history flip-flop prevents the resetting of memory request flip-flop 17M resulting in the MYREQT+ signal remaining a binary ONE further resulting in the memory continuing to request a bus cycle via driver 18M. During the first memory response cycle, the leading edge of signal MYDCNN+ on line 182 generates the double response signal DWRESP− at the output of NAND gate 83 which also has as an input the Q output of double fetch history flip-flop 80, signal DWDHIS+ being a binary ONE. Signal DWRESP−, being a binary ZERO, is inverted by inverter 84 and again by driver 85 and sent to the bus as signal BSDBPL−, being a binary ZERO. Signal DWRESP− also resets the double fetch history flip-flop 80 by clocking the $\overline{Q}$ output thereof at the D input thereof to the Q and $\overline{Q}$ outputs thereof. This resetting of double fetch history flip-flop 80 results in the $\overline{Q}$ output thereof being a binary ONE so that the next MYDCNN+ signal occurring at NAND gate 81 will function to reset memory user flip-flop 15M via inverter 82 and NOR gate 29M. The resetting of user flip-flop 15M results in the resetting of memory request flip-flop 17M and the signal MYREQT+ at the output thereof becoming a binary ZERO resulting in the memory no longer requesting a bus cycle via driver 18M.

The requesting unit, the central processor in this example, acknowledges the first data word by responding with the signal BSACKR− being a binary ZERO, which resets memory grant flip-flop 22M. If the requesting unit NAKs or WAITs the memory response cycle, or does not respond, the data is lost. Since the memory request flip-flop 17M is not reset in response to the first memory response cycle, memory continues to request the bus via signal BSREQT− remaining a binary ZERO. Memory therefore generates another MYDCNN+ signal of binary ONE via NAND gate 19M and grant flip-flop 22M to send the second data word. Since the double fetch history flip-flop 80 is reset at the end of the first response cycle, during the second response cycle the signal MYDCNN+ resets the user flip-flop 15M and request flip-flop 17M. Also the signal BSDBPL− is not driven to the binary ZERO state indicating that there is no other information which should be expected by the requesting unit.

If, for some reason, the second data word can not be obtained from the memory controller (e.g., if the central processor requests a double fetch operation and the memory address provided, i.e., the address of the first of the two words is that of the highest location in this particular memory controller), the memory resets the double fetch history flip-flop 80 via signal I2WRES− via OR gate 77 and inverter 79 by signal DWDRES− being a binary ZERO at the reset input thereof. This resetting of flip-flop 80 occurs after its setting by signal DWDSET− being a binary ZERO at the set input thereof but before the first response cycle of the memory as hereinafter described, i.e., when the second word is not present, the DWDSET+ signal from timing generator 95 goes to the binary ONE state and returns to the binary ZERO state before the I2WRES− signal from NOR gate 93 occurs. In this case the memory controller does not set signal BSDBPL− to a binary ZERO during the delivery of the first data word, indicating to the requesting unit that a second word is not coming.

Address registers 89 and 90 combine with multiplexers 91 and 92 and NOR gate 93 to determine if the second word of the double fetch request is present in the same memory controller as the memory controller that contains the first word of the double fetch request. This determination is made as follows when the master unit, e.g., the central processor, makes the double fetch request. Element 88 contains line receivers for each bus address signal BSAD00− to BSAD22− making the inverted signals BSAD00+ to BSAD22+ available to address registers 89 and 90. Address registers 89 and 90 are each composed of six cascaded synchronous 4 bit up/down counters of the type whose part number is SN74193 which is manufactured for example by Texas Instruments, Inc. These address registers have the ability to retain the information loaded into them by the appearance of a binary ZERO signal at their load (L) input and also the ability to increment by one and retain the incremented value. The address registers increment their content by one when the signal at their +1 input transitions from the binary ZERO to the binary ONE state. During the master's double fetch request cycle, the bus address signals are gated into both registers 89 and 90 when the memory controller acknowledges the double fetch request by the signal MYACKR+ becoming a binary ONE which via inverter 96, produces a binary ZERO MYACKR− signal at the L input of registers 89 and 90. With the address of the first word thus loaded into both registers 89 and 90, other logic not shown determines whether the address is odd or even. If the memory address of the first word is odd, the signal MAREUC− at the +1 input of the even word address register 90 transitions from a binary ZERO to a binary ONE thereby incrementing the contents of the even word address register 90. Even word address register 90 thus contains the address of the second (even) word to be fetched from memory. Similarly, if the address of the first word to be fetched from memory is even, signal MAROUC− at the +1 input of the odd word address register 89 transitions from a binary ZERO to a binary ONE thereby incrementing the contents of register 89 so that it contains the address of the second (odd) word to be fetched from memory. At this point, regardless of whether the address of the first word was odd or even, register 89 contains an odd word address and register 90 contains an even word address. Multiplexers 91 and 92 operate in a similar fashion to that of multiplexer 48 of FIG. 10 in determining whether the 8k memory module containing the second word of the two words to be fetched is present in the controller. By using signal MARE08+ derived from even word address register 90 to indicate whether the word addressed by the even word address register is in the lower 16k words or upper 16k words, multiplexers 91 and 92 selectively gate one of the inputs to the output thereof. That is, if signal MARE08+ is a binary ZERO, signal MYMOSB− is gated to the output of multiplexer 91 and signal MYMOSA− is gated to the output of multiplexer 92. If signal MARE08+ is a binary ONE, signal MYMOSD− is gated to the output of multiplexer 91 and signal MYMOSC− is gated to the output of multiplexer 92.

As seen hereinbefore in discussing multiplexer 48 of FIG. 10, if signal MARE08+ is a binary ZERO indicating that the lower 16k words of the memory controller are being addressed by the even word address register, a binary ZERO at the output of multiplexer 91 indicates that memory module B is present and a binary ZERO state at the output of multiplexer 92 indicates that memory module A is present. If signal MARE08+ is a binary ONE indicating that the even word address register is addressing a word in the upper 16k words of the memory controller, a binary ZERO state at the output of multiplexer 91 indicates that memory module D is present in the controller and a binary ZERO at the output of multiplexer 92 indicates that memory module C is present.

The operation of multiplexers 91 and 92 in conjunction with the address registers 89 and 90 can best be explained by referring to FIG. 14 and examining the boundary cases. If the address contained in even word address register 90 is in the lower 16k words of memory, i.e., signal MARE08+ is a binary ZERO, the boundary cases are the cases where the even word address register contains an address between 0 and 16382. If the even word address register 90 contains the address 0, the odd word address register 89 must contain the address of the next higher word, i.e., word 1 and multiplexers 91 and 92 of FIG. 9A require that memory modules A and B be present in the memory controller. In this case where even word address register 90 contains address 0 the odd word address register can not contain the next lower address because the memory controller logic of FIG. 9 would not have responded because the address on the bus, the address of the first word to be fetched, was not present within the controller and therefore the address on the bus would not have been gated to address registers 89 and 90. If the address in the even word address register 90 is the last word in module A, i.e., address 16382, both the next higher and next lower words which could be addressed by odd word register 89 are contained in memory module B and multiplexers 91 and 92 indicate the presence of memory modules A and B. If signal MARE08+ is a binary ONE, indicating that the address contained in the even word address register 90 is within the upper 16k words of memory, multiplexers 91 and 92 indicate the presence of memory modules C and D. In the case of the upper 16k words of memory, if the even word address register addresses the first word of memory module C, i.e., address 16384, the next higher address is contained in memory module D whose presence is indicated by multiplexer 91 or if the next lower word is addressed, i.e., word 16383, the presence of memory module B was indicated during the first bus cycle by multiplexer 48 of FIG. 10 when the double fetch request was originally made. If the even word address register 90 contains the address of the last word in memory module C, i.e., 32766, both the next higher and next lower address words are contained in memory module D whose presence is again indicated by multiplexer 91. The one remaining boundary case is that of where the double fetch request addresses the last word on the memory controller, i.e., address 32767. In this case, after the address is gated from the bus and loaded into address register 89 and 90, the even word address register 90 is incremented by one resulting in the address of 32768. This will result in the signal MARE08+ being a binary ZERO which, as seen hereinbefore, will result in multiplexers 91 and 92 indicating the presence or absence of memory modules A and B, which compose the lower 16k words of memory on a particular memory controller. In this case, where the first word addressed in a double fetch request is the last word on the memory controller, the second word does in fact reside in the lower 16k words of memory, but not on the present memory controller but on the next memory controller. This case is detected by signal MAR00L+ of FIG. 9A becoming a binary ONE in response to a carry occuring out of bit position 8 into bit position 7 of the even word address register 90 when the address is incremented. By putting the output of multiplexers 91 and 92, address carry signal MAR00L+ and inhibit two word signal INH2WD+ (normally a binary ZERO) into NOR gate 93 the output thereof, signal I2WRES−, will be a binary ONE when the second word of the double fetch request is present in the particular memory controller. Signal I2WRES− will be a binary ZERO when the second word is not present in the memory controller and via OR gate 77 and inverter 79 results in the resetting of the double fetch history flip-flop 80.

Address registers 89 and 90, along with other logic not shown in FIG. 9A, are also used to address the odd and even words as they are retrieved from the memory modules. This permits two words to be retrieved in an overlapped manner, one word from a memory module containing even addressed words and one word from a memory module containing odd addressed words. The retrieval of the second word being initiated slightly after, by way of illustration 150 nanoseconds after, the retrieval of the first word. This results in the second word becoming available in the memory controller before the completion of the response bus cycle that delivers the first word to the requesting unit thereby increasing system throughput by having the second word available for immediate transfer to the requesting unit during a second response bus cycle.

The memory controller user flip-flop 15M of FIG. 9 is set in the following manner. Referring again to FIG. 9A as seen hereinbefore when the memory controller acknowledges a read request the read memory signal READMM+, an output of element 74, becomes a binary ONE and in conjunction with initialization signal INITMM— being a binary ONE indicating that initialization is not in progress, results in the output of AND gate 86 being a binary ONE. This binary ONE, in conjunction with the memory refresh signal REFCOM— being a binary ONE indicating that a memory refresh cycle is not in progress, results in the output of NOR gate 87, signal INREDY— on line 184, being a binary ONE at the D input of user flip-flop 15M. The later occurrence, by way of illustration 400 nanoseconds after signal MYACKR+ transistors from a binary ZERO to a binary ONE, of the signal DCNNGO— on line 185 at the clock input of flip-flop 15M transitioning from a binary ZERO to a binary ONE will cause the setting of user flip-flop 15M by clocking the D input onto the outputs thereof. It is noted that at the time this clocking occurs, the output of NOR gate 29M is a binary ONE. Again, referring to FIG. 9A, it is noted that the outputs of the flip-flops of element 74 are cleared by the occurrence of the output of NOR gate 73, signal CLRMOD— becoming a binary ZERO in response to any of the inputs thereof becoming a binary ZERO, i.e., an initialize, a bus clear or a memory refresh occurring. The timing relationships among memory controller signals during a double fetch operation are shown in the lower portion of FIG. 12 described hereinafter.

CENTRAL PROCESSOR BUS INTERFACE LOGIC

Figure 11:
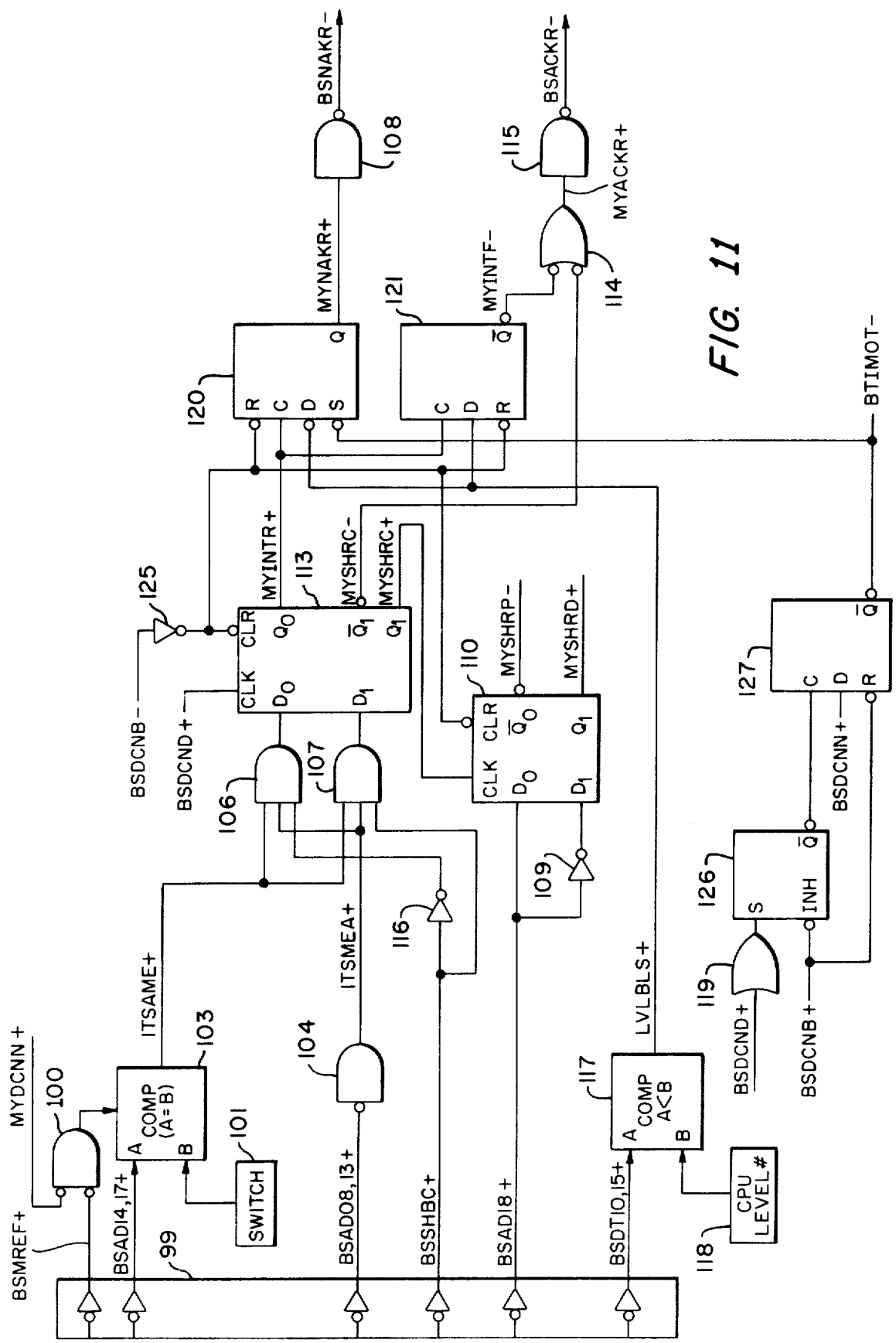
FIGS. 11 and 11A illustrate bus interface logic of a central processor coupled with the bus of the present invention.

Now, referring to the typical central processor bus coupling logic of FIG. 11, the signals are received from the bus by means of the receivers included in element 99. The signal BSMREF— is received by one of such receivers and used to partially enable AND gate 100 if the address being received is not a memory address. Signal MYDCNN+ further enables AND gate 100 if the central processor is not the current bus master (i.e., the central processor has not placed the address on the bus). The output of AND gate 100 provides one input of comparator 103 so as to enable such comparator. One of the inputs for comparison by comparator 103 is the central processor address which in this case by way of example are four in number and are indicated as the BSAD14+ through BSAD17+ signals. This address received at one input of comparator 103 is compared with the address set by for example the hexadecimal switch 101 in the central processor itself. When the received address and the switch 101 provided address are compared and found to be equal, then comparator 103 generates ITSAME+ signal which partially enables gates 106 and 107.

Further address bits BSAD08+ through BSAD13+ are received at the inputs of AND gate 104 which determines whether or not these bits are all ZEROS. If they are all ZEROS, then the ITSMEA+ signal is generated to also partially enable gates 106 and 107. Enabling of further input of either gates 106 or 107 will effectively set a respecting flip-flop in element 113.

The other input to AND gate 106 is a second-half bus cycle BSSHBC+ signal which is coupled to gate 106 via inverter 116. The second-half bus cycle signal is also received at one input of AND gate 107.

Thus, AND gate 107 will be fully enabled if two of the inputs thereto indicate that this is the addressed device and that from the other input thereof, that this is a second-half bus cycle as indicated by signal BSSHBC+. Thus, by the enabling of AND gate 107 the MYSHRC— signal will be generated and will be coupled to one input of OR gate 114. OR gate 114 will provide an ACK signal (BSACKR—) via driver 115.

The full enabling of AND gate 107 in addition to generating the MYSHRC— signal at the $\overline{Q1}$ output of element 113 also generates the MYSHRC+ signal at the Q1 output of the same flip-flop included in element 113. The transition of the MYSHRC+ signal from the binary ZERO to the binary ONE state is used to clock the inputs of the respective flip-flops of element 110 to the outputs thereof. If signal BSAD18+, the high order bit of the function code field shown in FIG. 3, is a binary ONE (function code of 20, base 16) at the D0 input of element 110 indicating the the device (memory, for example) is responding to a double fetch request, the signal MYSHRP— at the $\overline{Q0}$ output of element 110 will be a binary ZERO indicating that this second-half bus cycle is in response to a double fetch (procedure) request by the central processor. If signal BSAD18+ is a binary ZERO (function code of 00, base 16) indicating that the device is responding to a single fetch (data) request, then a binary ONE will be generated by inverter 109 at the D1 input of element 110 resulting in the signal MYSHRD+ at the Q1 output of element 110 being a binary ONE indicating that this second-half bus cycle is in response to a single fetch request by the central processor. In the multicycle fetch operations of the central processor, in which the processor is expecting a response cycle from the slave, the signals MYSHRP— and MYSHRD+ are used to indicate to the central processor that the second-half bus cycle presents the expected data from a previous double or single fetch request respectively. The flip-flops in element 110 are cleared by signal BSDCNB— via inverter 125 in the same manner as previously discussed for similar flip-flop type elements, thereby initializing the flip-flops following the bus cycle.

Gate 106 will be fully enabled when the proper unit address is received and if this is not a second-half bus cycle, which thereby generates a positive pulse labelled as the MYINTR+ signal at the output of the respective flip-flop included in element 113. The MYINTR+ signal causes the logic of FIG. 11 to determine whether an ACK or a NAK signal will be generated. Which one of such signals is generated will depend on the interrupt level that is currently operating in the system as compared to the interrupt level of the device seeking processing time.

The decision regarding whether or not the interrupt level is sufficient is determined by means of comparator 117 which is a comparator for determining whether or not the A input is less than the B input. The A input of comparator 117 receives the BSDT10+ through BSDT15+ signals which indicate, in the format shown in FIG. 5, the interrupt level of the device coupled with the bus which is seeking data processing time. There are a plurality of interrupt levels provided in the system.

Interrupt level number 0 receives the highest possible accessibility to data processing time and accordingly is non-interruptable. Thus the lower the interrupt level number, the less chance there is that such device's ongoing processing will be interrupted. Thus if the level number received at the A input of comparator 117 is less than the current level operating in the central processor as indicated by the level number in block 118, then the device seeking to interrupt as indicated by the signal received at input A will in fact be able to do so. If the A input is equal to or greater than the B input, then the LVLBLS+ signal will not be generated and a NAK signal will be provided by the driver 108 and flip-flop 120 as shall be hereinafter described.

Thus, if the interrupt level received at input A of comparator 117 is less than that received at input B, the LVLBLS+ signal will be a binary ONE and will be coupled to the D input of both flip-flops 120 and 121, it being noted that the D input of flip-flop 120 is an inversion. If the A signal is equal to or greater than the B signal as indicated by comparator 117, then a binary ZERO signal will be generated for the LVLBLS+ signal which will be received at the negation input of flip-flop 120. This will generate the NAK signal if the MYINTR+ signal is received at the clock input of flip-flop 120 by the setting of the respective flip-flop in element 113. If the level was sufficient, i.e., if the A input was less than the B input as indicated by comparator 117, then a binary ONE will be generated at the LVLBLS+ signal and accordingly the MYINTR+ signal will clock this to the $\overline{Q}$ output of flip-flop 121 into one input of OR gate 114 which, via driver 115, will generate the ACK signal. Thus, if the MYNAKR+ signal is a binary ONE, then the NAK signal will be generated and if the MYINTF— signal is a binary ZERO, an ACK signal will be generated. The flip-flops in element 113 are cleared by inverter 125 in the same manner as previously discussed for similar flip-flop type elements. It should be noted that an ACK signal will be generated independent of the indication by comparator 117, if in fact this is a second-half bus cycle. In such event the MYSHRC— signal is one of the flip-flops of elements 113 as coupled in the binary ZERO state to the other input of OR gate 114 so as to generate the ACK signal thereby overriding any indication from flip-flop 121.

As indicated hereinbefore, the BSDCNB— signal via inverter 125 resets flip-flop 121 and flip-flop 120 thereby initializing the flip-flops following the bus cycle. In addition, flip-flop 120 is set by the logic associated with flip-flop 127 which generates a BTIMOT— signal indicating a bus time out condition, i.e., that a non-existent device was addressed and that in fact no response, either a NAK, an ACK or a WAIT has been generated by any potential slave device. Accordingly, there is provided a one-shot multivibrator 126, which may be set to have a 5 microsecond period for example. This multivibrator 126 is triggered by the receipt of the BSDCND+ signal, i.e., the strobe signal, which is received at the input of buffer 119. Since the timing of the multivibrator 126 is in motion, if a BSDCNB+ signal is not received which signal indicates the end of the bus cycle, then after the period set by multivibrator 126, the BTIMOT— signal is generated at the $\overline{Q}$ output of flip-flop 127 via the clocking of the BSDCNN+ signal received at the D input of flip-flop 127, it being noted that the BSDCNN+ signal indicates that the bus cycle is still in process. The BTIMOT— signal operates on flip-flop 120 to generate a NAK signal (BSNAKR—) via driver 108. If on the other hand, the BSDCNB+ signal terminates before the end of the period set by multivibrator 126, the timing of multivibrator 126 is terminated and flip-flop 127 is prevented from generating the signal BTIMOT—.

It is noted that the central processor logic in FIG. 11 generates either a NAK or ACK signal, however, a WAIT signal is not so generated by the central processor logic. The reason for this is that the central processor always has the lowest priority and accordingly, if it generates a WAIT signal, the other devices generating their requests to the central processor for service will possibly experience a hang up on the bus, if for example a higher priority device was the master to which the central processor responded with a WAIT signal. Thus, just because the higher priority device is waiting for the lowest priority device, i.e., the central processor, other devices will be disabled from using the bus.

The above discussion with respect to FIG. 11 has described the operation of the central processor, as slave, in responding to the memory, as master, making available the information requested by an earlier central processor, single or double fetch (memory read) request. Now with reference to FIG. 11A, the operation of the central processor will be discussed with respect to how the data placed on the bus by the memory is buffered by the central processor and the basis by which the central processor decides to make a single or double fetch request of memory. In the preferred embodiment, the central processor can, with one memory read request, signal that it wants either a single word from memory or it wants the delivery of two sequential words from memory (i.e., make a single or double fetch request). Further, in the preferred embodiment, the central processor can have outstanding at the same time a single fetch request directed to one memory controller and a double fetch request directed to a different memory controller. If both the single and double fetch request address memory locations are contained within the same memory controller the second request will be rejected by the memory controller as was seen above when discussing the logic associated with FIG. 10. The memory controller will reject the second request by generating a WAIT signal if it is still busy servicing the first request.

When requesting a double fetch operation, the central processor generates the double fetch signal (BSDBPL— being a binary ZERO). During the second-half bus cycle associated with the return of the first word from memory, the memory controller redelivers the double fetch signal BSDBPL— as a binary ZERO indicating that another word will follow. During the second-half bus cycle associated with return of the second word from memory, the memory does not redeliver the signal BSDBPL— thereby indicating that this is the last word of data to be sent. During the second-half bus cycle associated with the return of the single word from memory in response to a single fetch request, the memory controller does not redeliver the signal BSDBPL— thereby indicating that only a single fetch has been performed and no further second-half bus cycles will follow.

Figure 11A:
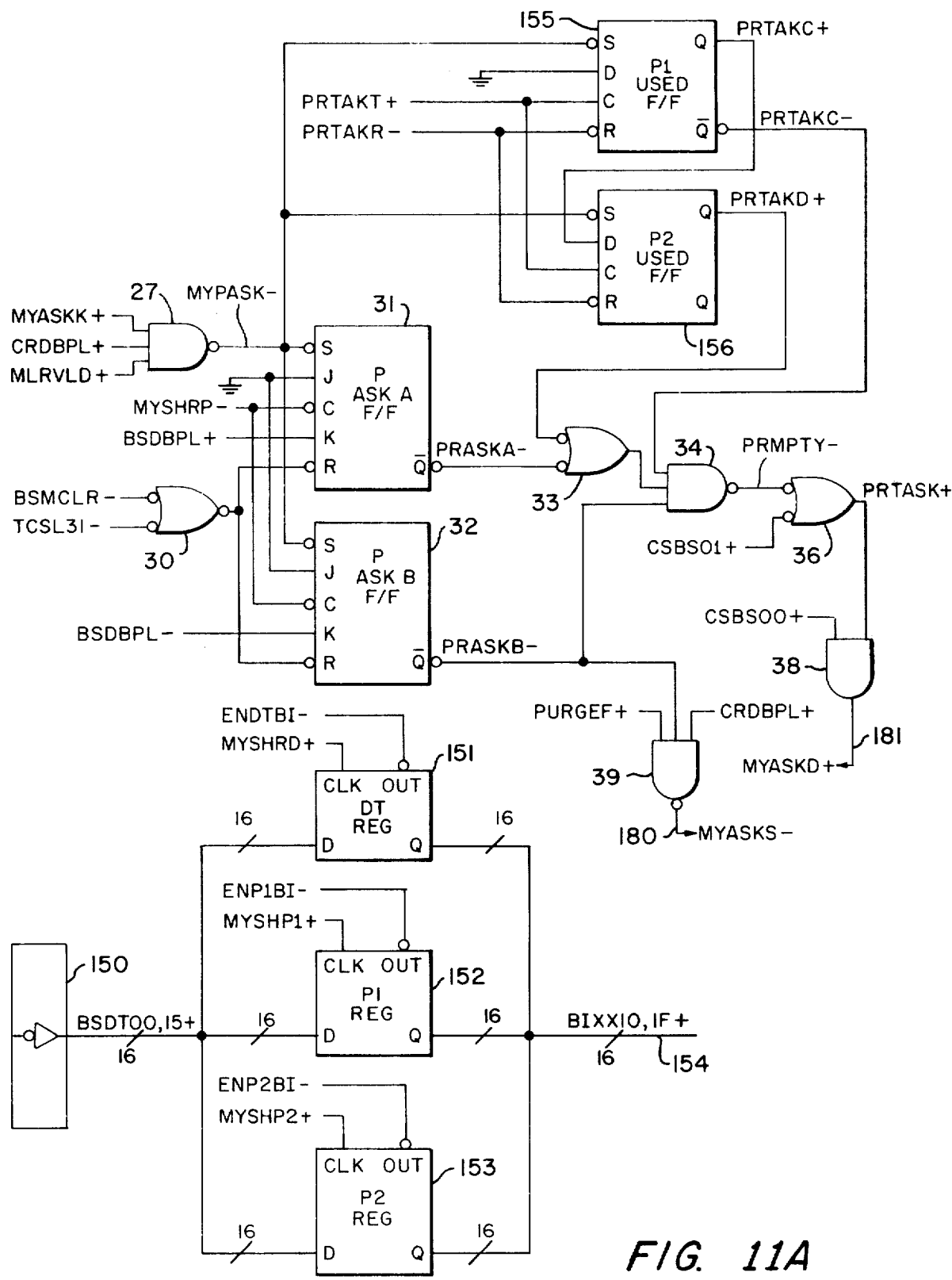

Now referring to FIG. 11A, double fetch data is always stored in the central processor in the P1 and P2 registers, elements 152 and 153, whereas single fetch data is stored in the DT register, element 151. Since a single central processor may have both a double fetch and single fetch request simultaneously outstanding, the central processor tags the request in the function code field shown in FIG. 4 at the time of the request. Single fetch requests are tagged with a function code of 00, while double fetch requests are tagged with a function code of 20, base 16. During the central processor fetch request, bus data line signals BSDT10— through BSDT15— constitute the tag. During the memory response cycle, address line signals BSAD18— through BSAD23— constitute the tag echoed by the memory in the function code field shown in FIG. 3.

Now referring to the typical central processor bus coupling logic of FIG. 11A, the requested data is received in the signals received from the bus by means of receivers included in element 150. Signals BSDT00+ through BSDT15+, which constitute one 16-bit word of data, are each connected to the data inputs of the DT register 151, P1 register 152 and P2 register 153. Registers 151, 152 and 153 are 16-bit registers with each register being composed of two integrated circuits of the type manufactured by Texas Instruments, Inc. whose part number is SN74S374 and each of which contains eight edge triggered D-type flip-flops. The data is clocked into these registers by the transition of the clock signal from the binary ZERO state to the binary ONE state. During a second-half bus cycle in response to a single fetch request, the signal MYSHRD+ from element 110 of FIG. 11 will transition from the binary ZERO to the binary ONE state and clock the word from memory into the DT register 151. During the first second-half bus cycle in response to a double fetch request, the signal MYSHP1+ clocks the data into the P1 register 152. During the second-half bus cycle in response to a double fetch request, the signal MYSHP2+ clocks the data into the P2 register 153. Signals MYSHP1+ and MYSHP2+ are always generated such that the first word of data in response to a double fetch request will be loaded into the P1 register 152 and the second word of data, if present in the memory controller, will be loaded into the P2 register 153. Once loaded, the data contained in registers 151, 152 and 153 is selectively gated onto the central processor internal bus 154, composed of the 16 signals BIXX10+ through BIXX1F+, by the occurrence of a binary ZERO signal at the output control of the respective registers, i.e., by the signals ENDTBI—, ENP1BI—, and ENP2BI— going to the binary ZERO state.

Two J-K type flip-flops, elements 31 and 32, keep track of the second-half bus cycle signals returned by the memory controller during a double fetch operation. Elements 31 and 32 are J-K negative edge triggered flip-flops with preset and clear of the type manufactured by Texas Instruments Inc., whose part number is SN74S112. P ask A flip-flop 31 and P ask B flip-flop 32 are set by the signal MYPASK— from NAND gate 27 and sample the second-half bus cycle when it is acknowledged by the central processor with the signal MYSHRP— from element 110 of FIG. 11. NAND gate 27 is partially enabled when signal MYASKK+, the output of user flip-flop 15 of FIG. 8, is in the binary ONE state indicating that the central processor is asking to request the bus. NAND gate 27 is further enabled by signal CRDBPL+ being a binary ONE indicating that a double fetch read should be made if registers P1 and P2 are empty. NAND gate 27 is still further enabled by CPU timing signal MLRVLD+ being a binary ONE. If two second-half bus cycles are to be received as indicated by signal BSDBPL+ being a binary ONE, flip-flop 31 is reset after the first second-half bus cycle is received and flip-flop 32 is reset after the second second-half bus cycle is received. If only one second-half bus cycle is to be received as in the case of a double fetch request in which only the first word is present in the memory controller, only flip-flop 32 is reset. Flip-flops 31 and 32 are both reset by the occurrence of a bus clear signal (BSMCLR— being a binary ZERO) or exception conditions such as master clear or bus time out by a signal (TCSL31— being a binary ZERO) via NOR gate 30.

Two other flip-flops, elements 155 and 156 keep track of when the central processor makes use of the data from the P1 and P2 registers 152 and 153. P1 used flip-flop 155 is reset when the central processor uses the first word, i.e., the word contained in P1 register 152 and P2 used flip-flop 156 is reset when the central processor uses the second word, i.e., the word contained in P2 register 153.

Flip-flops 155 and 156 are both set by signal MYPASK— from NAND gate 27. Signal MYPASK— being a binary ZERO thus sets flip-flops 31 and 32 to indicate that registers P1 and P2 are filling and sets flip-flops 155 and 156 to indicate that the contents of P1 and P2 have not yet been used. The P1 or P2 register is full only if it is not filling and not used. Flip-flops 155 and 156 are reset, P1 and P2 marked used, by signal PRTAKR— being a binary ZERO when a purge condition occurs (e.g., the central processor instruction counter is loaded in response to a branch instruction, interrupt or trap condition). P1 used flip-flop 155 is also reset by the signal PRTAKT+, which indicates that the central processor has used a word of procedure, clocking the binary ZERO at the grounded data input thereof onto the outputs thereof. P2 used flip-flop 156 is also reset by the signal PRTAKT+ clocking the signal PRTAKC+ at the data input thereof onto the output thereof. Before the first word of procedure is used, PRTAKC+ is a binary ONE so that flip-flop 155 is reset when the first word of procedure is read. PRTAKC+ is a binary ZERO after the first word of procedure is used, resulting in flip-flop 156 being reset when the second word of procedure is used.

A double fetch operation is requested by the central processor only if the P1 or P2 registers 152 and 153 are both empty and the central processor does not currently have outstanding another double fetch request.

The P registers empty signal PRMPTY—, output by NAND gate 34, is used to decide whether the central processor should make a double fetch request based on the status of flip-flops 31, 32, 155 and 156. If the Q output of P2 used flip-flop 156, signal PRTAKD+, is a binary ZERO indicating that the P2 register 156 is empty or if the $\overline{Q}$ output of flip-flop 31, signal PRASKA—, is a binary ZERO indicating that only one word was received in response to the last double fetch request, then the output of OR gate 33 will be a binary ONE partially enabling NAND gate 34. NAND gate 34 is further enabled if the $\overline{Q}$ output of P1 used flip-flop 155, signal PRTAKC— is a binary ONE indicating that the P1 register 152 is empty (used). NAND gate 34 is further enabled if the $\overline{Q}$ output of flip-flop 32, signal PRASKB— is a binary ONE indicating that all the data expected to be received in response to a double fetch operation has been received. Thus, NAND gate 34 is fully enabled and signal PRMTPY— will be a binary ZERO whenever the data in the P1 and P2 registers 152 and 153 has been used and there is no outstanding double fetch request in the process of filling the P1 and P2 registers.

fetch, I/O or write operation. When AND gate 38 is fully enabled, signal MYASKD+ on line 181 becomes a binary ONE and in conjunction with the clocking signal MCLOCK+ will result in the setting of user flip-flop 15 of FIG. 8 indicating that the central processor wants to use the bus.

In the preferred embodiment, during the execution of one instruction by the central processor, the central processor prefetches two words of memory and stores them in registers P1 and P2. This prefetch of instruction words from memory, i.e., procedure, takes place only if both registers P1 and P2 are empty. For example, if the central processor is currently executing the instruction located at location 1000, the central processor will do a double fetch request asking for locations 1001 and 1002 to be delivered to it from the memory. However, if the central processor executes a branch instruction, the prefetch procedure in the P1 and P2 registers 152 and 153 must be discarded including that which may not yet have arrived from the memory. Continuing the above example, if during the execution of location 1000, locations 1001 and 1002 are prefetched and if the instruction in location 1001 contains a branch instruction to location 1007, then when the branch instruction from location 1001 which was temporarily stored in the P1 register 152 is executed, the contents of 1002 which are temporarily stored in the P2 register 153 must be discarded and a new double fetch request made for the contents of memory location 1007 to which the branch instruction will transfer control and for location 1008. Signal PURGEF+, one of the inputs to NAND gate 39, remembers any double fetch request by remaining a binary ONE until all previously requested words have arrived. When the $\bar{Q}$ output of flip-flop 32, signal PRASKB−, becomes a binary ONE indicating that all data expected to be received in response to a double fetch operation has been received, and signal CRDBPL+ is a binary ONE indicating that a double fetch operation should be made if registers P1 and P2 are empty, then in conjunction with signal PURGEF+ being a binary ONE, NAND gate 39 will be fully enabled and signal MYASKS− on line 180 will be a binary ZERO thereby setting user flip-flop 15 of FIG. 8 which will result in the central processor requesting a bus cycle to do a memory fetch operation. User flip-flop 15 of FIG. 8 is normally set by signal MCLOCK+ clocking signal MYASKD+ as is the case when the central processor uses the second word of procedure, from P2 register 153. Signal MYASKS− is used to set user flip-flop 15 to cover the case when purge occurs after a double fetch request has been made and not completed, e.g., a branch instruction is executed while the P1 and P2 registers 152 and 153 are in the process of filling.

Single fetches require at least two central processor steps. The first central processor step generates a single fetch read request of the memory and causes an indicator to be set when the memory (or an I/O device) accepts the single fetch request. The second central processor step, which may be any number of central processor steps after the first step, attempts to gate the data from the DT register 151 onto the central processor internal bus 154. If the second-half bus cycle associated with the memory responding to the single fetch request has not yet arrived, the previously set indicator stalls the central processor clock until the signal MYSHRD+ from element 110 of FIG. 11 clears the indicator.

Figure 12:
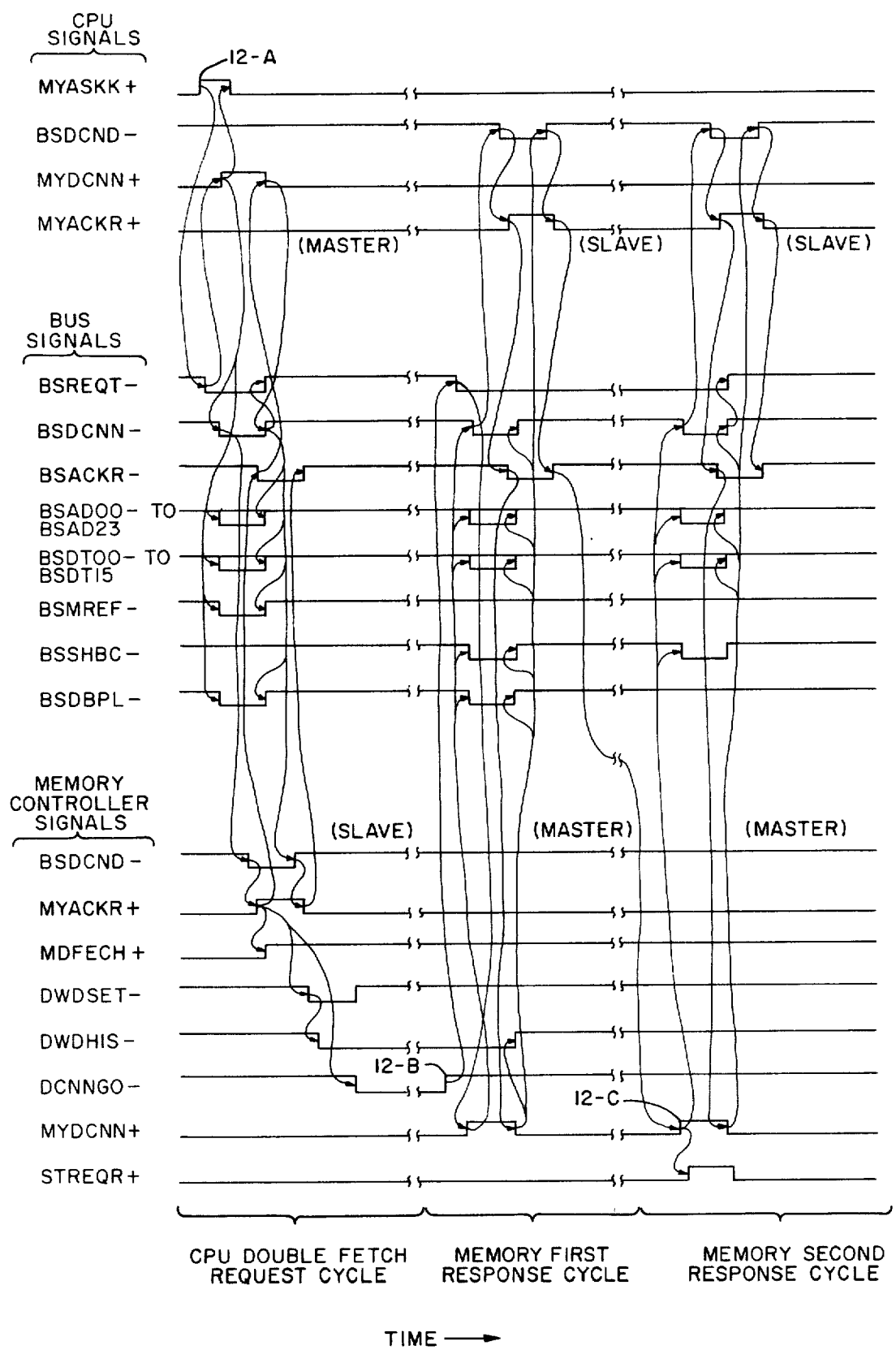
FIG. 12 illustrates a timing diagram of the operation of the central processor, bus and memory controller of the present invention.

The above discussion of FIG. 11A completes the discussion of the system logic associated with a double fetch operation. The timing diagram of FIG. 12 will now be discussed to put in perspective the above described control signals of the central processor, the bus and the memory controller. The set of 4 signals at the top of FIG. 12 are those of the central processor which makes a double fetch request. These signals are generated by the logic shown in FIGS. 8, 11 and 11A. The signals in the middle of FIG. 12 are those associated with the data bus of the data processing system which connect the central processor logic to the memory logic. The eight signals at the bottom of FIG. 12 represent the signals of the memory controller which are generated by the logic shown in FIGS. 9, 9A and 10. FIG. 12 is further divided in the vertical direction into three columns. The left most column represents the set of signals associated with the central processor making a double fetch request of the memory. The center column of FIG. 12 represents the signals associated with the first second-half bus cycle in which the memory controller returns to the central processor the first word requested in the double fetch request. The right column of FIG. 12 represents the signals associated with the memory controller returning to the central processor the second word requested in a double fetch request during the second second-half bus cycle. The double fetch operation is started in FIG. 12 by the CPU signal MYASKK+ going to the binary ONE state at time 12-A indicating that the central processor as master requests two words of data from memory as slave. When CPU signal MYASKK+ becomes a binary ONE, the central processor priority network logic of FIG. 8 forces bus signal BSREQT− to the binary ZERO state and, if no other higher priority device is requesting a bus cycle, results in the central processor being granted the bus, forcing CPU signal MYDCNN+ to a binary ONE state. Once the central processor is granted the bus, the central processor places on the bus the address of the first word to be fetched in the double fetch operation, the central processor channel number and the function code indicating that this is a double fetch request along with other signals which indicate that this is a double fetch memory read operation. The memory controller logic of FIGS. 9, 9A and 10, after delaying to allow the signals on the bus to become stable, then compares the address on the bus with that of the address controlled by the memory controller and if the first word of the double fetch request is contained within the controller generates an ACK signal which is returned to the central processor logic relinquishing control of the bus to the next user. The ACK signal generated by the memory controller also results in the memory controller checking to see whether the second word addressed by the double fetch request is present within the controller and if so, the double word history flip-flop 80 of FIG. 9A is set to indicate a double fetch operation is to be performed and the memory proceeds to retrieve two words of information from separate memory modules in an essentially parallel (overlapped) manner.

When the first word of data becomes available in the memory controller, the memory controller signal DCNNGO− becomes a binary ONE at time 12-B resulting in the memory priority network logic of FIG. 9 bidding for the bus by forcing bus signal BSREQT− to the binary ZERO state thus starting the first response cycle, i.e., the first second-half bus cycle with the memory as master and the CPU as slave. If the bus is not in use and the memory is the highest priority device requesting the bus, the bus will be granted to the memory controller and the memory controller signal MYDCNN+ will become a binary ONE. The granting of the bus to the memory controller results in the memory controller logic gating onto the bus data lines the first word requested in the double fetch request. The channel number of the central processor which made the double fetch request along with the double fetch request function code is gated onto the bus address lines, and other signals indicating that this is the first response cycle of a double fetch request are gated onto other bus lines. The central processor logic, after delaying to allow the signals on the bus to become stable, samples the bus signals and if the central processor channel number on the bus address lines is the channel number of the particular central processor, acknowledges the first second-half bus cycle and gates the memory word on the bus data lines into P1 register 152. The acknowledgement by the central processor of the first response cycle results in the memory controller logic releasing the bus and resetting the double word history flip-flop 80. This completes the first memory response cycle, i.e., the first second-half bus cycle.

With the second word of data available to the memory controller, the memory controller as master continues to bid for the bus and when granted at time 12-C, gates the second word of data onto the bus. The central processor acknowledges the second second-half bus cycle and gates the second word of memory into the P2 register 153 thereby completing the double fetch operation. It should be noted that, the second time the bus is granted to the memory controller, the memory controller signal MYDCNN+ going to the binary ONE state results in memory controller signal STREQR+ going to the binary ONE state which results in the memory request flip-flop 17M of FIG. 9 being reset so that the memory controller will no longer be requesting the bus.

It is noted that to simplify FIG. 12, the CPU signal BSDCND− is not shown going to the binary ONE state in response to the bus signal BSDCNN− going to the binary ONE state during the double fetch request cycle when the CPU is the master. Likewise, memory signal BSDCND− is not shown going to the binary ONE state in response to the bus signal BSDCNN− going to the binary ONE state during the first and second response cycles when the memory is the master. FIGS. 8 and 9 show that controller signals BSDCNN− will respond to bus signal BSDCNN− after the delay of elements 25 and 25M respectively, whether the controller is the master or the slave but for the purposes of FIG. 12, only the slave signal BSDCND− is of interest and therefore only it is shown responding.

Figure 13:
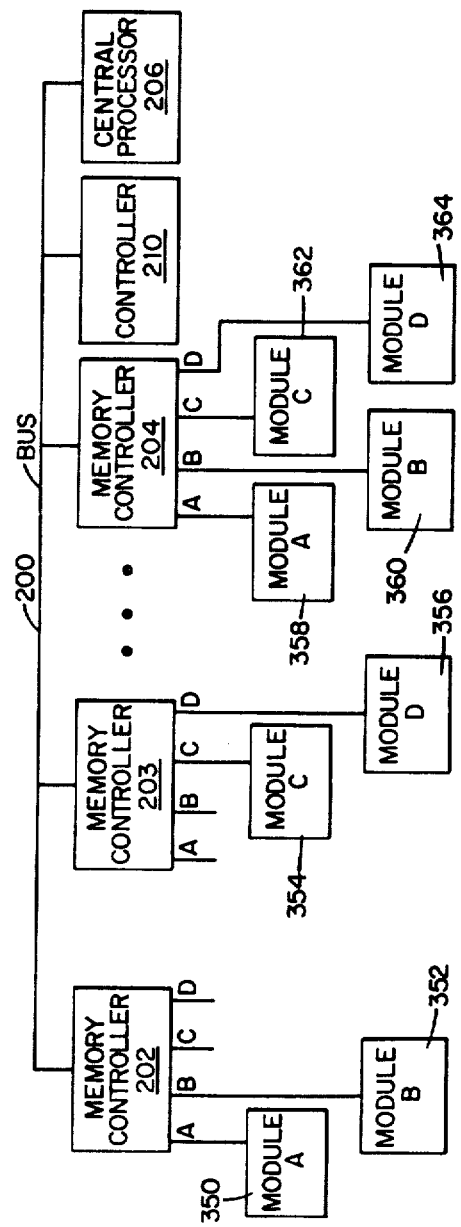
FIG. 13 illustrates an addressing technique of the present invention.

The manner in which the apparatus of the present invention enables the addressing of contiguous memory space, independent of the mix of memory types based on speed, type, i.e., magnetic core or semiconductor, and other characteristics, is more particularly explained with respect to FIG. 13. The bus 200 is shown coupled to memory controllers 202, 203, 204, as well as the other controllers such as controller 210 and the central processor 206. As discussed hereinbefore, by way of example, each memory controller is capable of addressing memory modules up to four in number. These modules may be connected to positions A, B, C and D of the respective memory controllers as shown in FIG. 14. Each memory controller receives its own address as well as the address of the module associated therewith. The module address is received as two bits over the bus 200, such bits designated as BSAD08+ and BSAD22+ as shown in FIG. 10. The memory controller's address is received as bits BSAD00− through BSAD07+. Thus, only the memory modules whose controller is addressed will respond. Therefore, as can be seen for the normal case, memory controller 204 has connected to its positions A, B, C and D, memory modules A-358, memory module B-360, memory moduled C-362 and memory moduled D-364. If memory controller 204 is addressed and the two bit sub-address designates for example moduled C-362, then module C will respond to a single word request and modules C and D will respond to a double fetch request.

As indicated hereinbefore, if there should be a mix in memory types as indicated by the above-mentioned characteristics for example, and should such mix be less than the full memory controller complement which was previously given by way of example as 32,000 words of storage, wherein each module contains 8,000 words of storage, then contiguous memory addresses will not be available, since address space of 32,000 words of memory must be left available for each memory controller in order to be able to increase the memory capacity of the system at a later date. As shall be seen in FIG. 13, it is possible to utilize only a portion of each of such memory controllers in order to provide such contiguous addressing.

Thus, referring to FIG. 13, and assuming that module A-350 and module B-352 are of one memory type and that module C-354 and moduled D-356 are of a different memory type, then memory controller 202 may be connected to control the access of modules A and B and memory controller 203 may be connected to control the access of modules C and D. In such case memory controller 202 and memory controller 203 will have the same address. In such configuration, the position C and D of controller 202 and positions A and B of controller 203 will not be available for use unless the system is completely reconfigured. Thus, when both memory controllers 202 and 203 see their address, i.e., the same address, then they both seek to respond, dependent however upon which module A, B, C or D is addressed by the two module address BSAD08+ (lower or upper 16k words) received on bus 200. Thus only one controller 202 or 203 will respond dependent upon which of the modules is addressed.

The above was by way of illustration only, it being understood that for example more than four such modules may have been coupled with a given controller and by way of the present example, for example controller 202 may have been connected to just one module A and controller 203 may have been connected to modules B, C and D in the same respective positions. It being noted as hereinbefore explained, that this configuration, module A on one controller and modules B, C and D on a second (double fetch memory) controller, that double fetch requests that address words located in modules A and B (except for the last word of module B) will result in a single word being returned whereas double fetch requests that address words located in modules C and D (except the last word of module D) will result in two words being returned. It can be seen by the present example, that if a third module were connected to position C of controller 202 and module C-354 is connected to controller 203, that if such module C was addressed and controllers 202 and 203 had the same address, then both such controllers would respond in response to receipt of their identical address and the module C address thereby causing an error condition. It has been thus seen how contiguous addresses may be obtained by use of the present invention independent of the memory characteristics coupled in the system.

While the invention has been particularly shown and described with reference to a preferred embodiment performing a double fetch operation, it will be understood by those skilled in the art that a multifetch operation can be performed by having the first and all except the last response cycle transfer the double (multi) fetch signal BSDBPL − . It being further understood that the double and multifetch operations can be performed between devices other than the central processor and memory controller. It still being further understood by those skilled in the art that the foregoing and other changes in form and details may be made therein without departing from the spirit and scope of the invention.

Having described the invention, what is claimed as new and novel and for which it is desired to secure Letters Patent is:

1. A system comprising a plurality of units coupled to transfer information over a common bus between any two of said plurality of units during asynchronously generated information transfer cycles, a priority means coupled to said common bus for determining the priority of each of said plurality of units based on the relative position of each of said plurality of units from one end of said common bus said system comprising:
   A. means, included in each of said plurality of units and coupled to said common bus, for generating a transfer cycle if a unit is the highest priority unit requesting said transfer cycle;
   B. transfer logic, included in a first unit and coupled to said common bus, having
      1. means for enabling the transfer over said common bus of first information from said first unit to a receiving unit of said plurality of units during a first transfer cycle, if said first unit is the highest priority requesting unit, said first information indicating that second information is requested to be transferred to said first unit from said receiving unit during a plurality of further transfer cycles, a last transfer cycle of said plurality of further transfer cycles indicating that it is said last transfer cycle, each transfer cycle, except said last transfer cycle of said plurality of further transfer cycles, indicating that it is not said last transfer cycle; and
      2. means, coupled to said means for enabling, for indicating to said transfer logic that said second information has been requested;
   C. means, included in said receiving unit and coupled to said common bus, for inhibiting the transfer of information with any other unit until said receiving unit transfers said second information to said first unit; and
   D. control means, included in each of said units and coupled to said common bus and said means for generating, for enabling the transfer of information between any two of said plurality of units, except said receiving unit, at any time between the generation of said first transfer cycle and the completion of the transfer of said second information.

2. A system as in claim 1 wherein said control means for enabling includes means for enabling the transfer of information between any two of said plurality of units, except between said receiving unit and any other one of said plurality of units until said receiving unit completes the transfer of said second information.

3. A system as in claim 1 further comprising:
   A. means, included in said first unit and coupled to said common bus, for indicating the interruptability of said first unit to said first unit; and
   B. means, included in said first unit and coupled to said common bus and said means for indicating the interruptability, for enabling the transfer of information with said first unit over said common bus during any of said transfer cycles occurring at any one point in time, if the interruptability of said first unit is greater than the interruptability of a one of said plurality of units seeking to transfer information with said first unit.

4. A system as in claim 3 wherein said first unit is a central processor unit and said receiving unit is a memory control unit.

5. A system as in claim 4 wherein a unit of said plurality of units coupled closest to said one end of said common bus has the highest priority and wherein said memory control unit is coupled closest to said one end of said common bus and wherein said central processor unit is coupled farthest away from said one end of said common bus, whereby said memory control unit is the highest priority unit and said central processor unit is the lowest priority unit.

6. A system comprising:
   A. a plurality of units, including a first unit having a first unit address, and a memory control unit having a second unit address which is different from said first unit address; p1 B. a common bus, connected to each of said plurality of units, for enabling the transfer of information including data and addresses, to and from said plurality of units;
   C. means, included in each of said plurality of units and coupled to said common bus, for generating a plurality of transfer cycles over said common bus;
   D. a plurality of memory modules;
   E. said memory control unit having first and second module connection positions for coupling said plurality of memory modules thereto, said first and second connection positions having different position addresses;
   F. means, included in said memory control unit, for coupling a first module of said plurality of memory modules to said first position and a second module of said plurality of memory modules to said second position;
   G. means, included in said first unit, for addressing said memory control unit by transferring said unit address and said position address over said common bus as part of a transfer of first information from said first unit to said memory control unit during a first transfer cycle of said plurality of transfer cycles, said first information including a first memory address of a first memory word of a plurality of memory words to be fetched from said memory control unit, said plurality of memory words to be transferred to said first unit during a plurality of further transfer cycles, a last transfer cycle of said plurality of further transfer cycles indicating that it is said last transfer cycle, each transfer cycle, except said last transfer cycle, indicating that it is not said last transfer cycle, wherein a memory word comprises a plurality of bits of information; and H. means, included in said memory control unit, for positively responding over said common bus if said unit and position addresses transferred from said first unit correspond respectively to the unit address of said memory control unit and the position address to a connection position to which a memory module of said plurality of memory modules is coupled.

7. A system as in claim 6 wherein each of said memory modules has a capacity of storing N words of data wherein said first module contains even addressed words of data and said second module contains odd addressed words of data whereby the two coupled ones of said memory modules provide two times N words of contiguously addressable data.

8. A system as in claim 6 further including:
A. means, included in said memory control unit and responsive to said first information, for enabling the transfer to said plurality of memory words to said first unit during said plurality of further transfer cycles, said plurality of further transfer cycles asynchronously generated at points in time following said first transfer cycle;
B. means, included in said memory control unit, for determining if a next memory word of said plurality of memory words is present in said memory control unit before transferring a current memory word of said plurality of memory words to said first unit; and
C. means, included in said memory control unit and responsive to said means for determining, for transferring a not-last tranfer cycle signal over said common bus during each transfer cycle of said plurality of further transfer cycles except during said last transfer cycle.

9. A system as in claim 8 wherein said plurality of memory words is a consecutively addressed set of memory words.

10. A system comprising a plurality of units, a common bus, means included in each of said plurality of units for generating a plurality of transfer cycles, each of said plurality of units coupled to transfer information over said common bus between any two of said plurality of units during said plurality of transfer cycles, said system further comprising:
A. means, included in a first unit of said plurality of units, for enabling the transfer of first information to a second unit of said plurality of units during a first transfer cycle, said first information indicating a request for second information from said second unit, said second information to be transferred to said first unit from said second unit during a plurality of further transfer cycles;
B. means, included in said second unit and responsive to said first information, for enabling the transfer of said second information to said first unit during said plurality of further transfer cycles, a last transfer cycle of said plurality of further transfer cycles indicating that it is said last transfer cycle, each transfer cycle, except said last transfer cycle of said plurality of further transfer cycles, indicating that it is not said last transfer cycle, said plurality of further transfer cycles asynchronously generated at points in time following said first transfer cycle; and
C. means, included in each of said plurality of units, for enabling the tranfer of information between any two units of said plurality of units, except said second unit, during any transfer cycle generated between the time of said first transfer cycle and the time of said last transfer cycle.

11. A system as in claim 10 further comprising:
A. means, included in each of said plurality of units and coupled to said common bus, for indicating the one of said plurality of units having the highest priority;
B. means, included in each of said plurality of units and coupled to said means for generating, for asynchronously requesting a transfer cycle; and
C. means, included in said means for generating and responsive to said means for indicating and said means for requesting, for generating a transfer cycle if a particular unit generating a transfer cycle has requested a transfer cycle and if said particular unit is the highest priority unit of all units requesting said transfer cycle.

12. A system as in claim 10 further comprising:
A. means, included in said second unit, for storing an indication that said first information indicated a request for said second information; and
B. means, responsive to said indication of said means for storing, for enabling said second unit to respond busy to any further attempts to transfer information to said second unit.

13. A system as in claim 12 further comprising:
A. means, included in said second unit, for counting;
B. means, included in said second unit and coupled to said means for counting, for initializing said means for counting to the number of remaining transfer cycles of said plurality of further transfer cycles;
C. means, included in said second unit, for changing said means for counting to indicate the remaining number of transfer cycles of said plurality of further transfer cycles; and
D. means, included in said second unit and responsive to said means for counting, for resetting said indication of said means for storing when said means for counting indicates that there are no remaining transfer cycles of said plurality of further transfer cycles.

14. A system as in claim 13 further comprising:
A. means, included in said second unit and responsive to said first information, for transferring a response request control signal over said common bus to said first unit during each of said plurality of further transfer cycles of said second information;
B. means, included in said second unit and responsive to said means for counting, for transferring a not-last transfer cycle control signal over said common bus to said first unit during each transfer cycle except said last transfer cycle of said plurality of further transfer cycles of said second information; and
C. means, included in said first unit and responsive to said response request control signal and said not-last transfer cycle control signal, for receiving said second information.

15. A system as in claim 14 further comprising:
A. means, included in each of the said plurality of units and coupled to said common bus, for indicating the one of said plurality of units having the highest priority;
B. means, included in each of said plurality of units and coupled to said means for generating, for asynchronously requesting a transfer cycle; and C. means, included in said means for generating and responsive to said means for indicating and said means for requesting, for generating a transfer cycle if a particular unit generating a transfer cycle has requested a transfer cycle and if said particular unit is the highest priority unit.

16. A system as in claim 14 wherein said first unit is a central processor unit.

17. A system as in claim 16 wherein said second unit is a memory control unit.

18. A system as in claim 17 wherein said means for storing an indication and said means for counting are a single element and wherein said single element is a bistable element.

19. A system as in claim 17 wherein said first information is a request by said central processor for said memory control unit to read two words of data, where a word of data comprises a plurality of bits of information, and wherein said two words of data are transferred to said central processor unit in two transfer cycles.

* * * * *

UNITED STATES PATENT AND TRADEMARK OFFICE
CERTIFICATE OF CORRECTION

PATENT NO. : 4,236,203

DATED : November 25, 1980

INVENTOR(S) : John L. Curley et al.

It is certified that error appears in the above—identified patent and that said Letters Patent is hereby corrected as shown below:

The term of this patent subsequent to May 25, 1997, has been disclaimed.

Signed and Sealed this

Sixteenth Day of February 1982

[SEAL]

*Attest:*

*Attesting Officer*

GERALD J. MOSSINGHOFF

*Commissioner of Patents and Trademarks*